United States Patent
Yamazaki et al.

(10) Patent No.: US 9,276,486 B2
(45) Date of Patent: Mar. 1, 2016

(54) MATRIX CONVERTER AND METHOD FOR COMPENSATING FOR OUTPUT VOLTAGE ERROR

(71) Applicant: KABUSHIKI KAISHA YASKAWA DENKI, Kitakyushu-shi (JP)

(72) Inventors: Akira Yamazaki, Kitakyushu (JP); Joji Ebisu, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/541,040

(22) Filed: Nov. 13, 2014

(65) Prior Publication Data

US 2015/0130431 A1    May 14, 2015

(30) Foreign Application Priority Data

Nov. 14, 2013    (JP) .................................. 2013-236069

(51) Int. Cl.
*H02M 5/02*    (2006.01)
*H02M 5/293*    (2006.01)
(Continued)

(52) U.S. Cl.
CPC .............. *H02M 5/293* (2013.01); *H02M 1/088* (2013.01); *H02M 5/297* (2013.01); *H02M 2001/0003* (2013.01); *H02M 2001/0025* (2013.01); *H02M 2001/385* (2013.01); *H02M 2005/2932* (2013.01)

(58) Field of Classification Search
CPC ....... H02M 5/4585; H02M 1/12; H02M 1/32; H02M 5/271; H02M 5/02; H02K 47/30; H01F 30/14
USPC ......... 363/34, 37, 39, 50, 149, 152, 159, 163, 363/164
See application file for complete search history.

(56) References Cited

U.S. PATENT DOCUMENTS

2007/0217243 A1* 9/2007 Yamamoto et al. ........... 363/160
2009/0091954 A1* 4/2009 Yamanaka ...................... 363/34
(Continued)

FOREIGN PATENT DOCUMENTS

JP    2004-007929    1/2004
JP    2007-082286    3/2007
(Continued)

OTHER PUBLICATIONS

Blaabjerg et al., "A Nonlinearity Compensation Method for a Matrix Converter Drive", IEEE Power Electronics letters, Mar. 2005, pp. 19-23, vol. 3, No. 1, XP011128777, See Cite No. 4.
(Continued)

*Primary Examiner* — Adolf Berhane
(74) *Attorney, Agent, or Firm* — Mori & Ward, LLP

(57) ABSTRACT

A matrix converter includes a power converter, a command generator, and a commutation controller. The power converter includes bidirectional switches each having a conducting direction controllable by switching elements. The bidirectional switches are disposed between input terminals coupled to phases of an AC power source and output terminals coupled to phases of a load. The command generator generates a control command based on a voltage command specifying a pulse width of pulse width modulation control. The commutation controller controls the switching elements by a commutation method based on the control command so as to perform commutation control. The command generator includes a corrector to, when an error in an output voltage is caused by the commutation control, correct the pulse width specified in the voltage command in generating the control command to reduce the error in the output voltage.

14 Claims, 19 Drawing Sheets

(51) Int. Cl.
*H02M 1/088* (2006.01)
*H02M 5/297* (2006.01)
*H02M 1/00* (2007.01)
*H02M 1/38* (2007.01)

(56) References Cited

U.S. PATENT DOCUMENTS

| | | | |
|---|---|---|---|
| 2010/0091534 A1* | 4/2010 | Tadano | 363/157 |
| 2010/0109587 A1* | 5/2010 | Iwahori et al. | 318/400.09 |
| 2013/0229835 A1* | 9/2013 | Yamanaka | 363/37 |
| 2014/0117917 A1* | 5/2014 | Takeda et al. | 318/519 |
| 2014/0254230 A1* | 9/2014 | Inomata et al. | 363/163 |
| 2015/0003136 A1* | 1/2015 | Inomata et al. | 363/163 |
| 2015/0085552 A1* | 3/2015 | Inomata et al. | 363/163 |
| 2015/0085553 A1* | 3/2015 | Kinomura et al. | 363/163 |
| 2015/0102797 A1* | 4/2015 | Kinomura et al. | 323/311 |
| 2015/0115906 A1* | 4/2015 | Ebisu et al. | 323/217 |
| 2015/0130432 A1* | 5/2015 | Yamazaki et al. | 323/272 |

FOREIGN PATENT DOCUMENTS

| | | |
|---|---|---|
| JP | 2007-166749 | 6/2007 |
| JP | 2007-209109 | 8/2007 |
| JP | 2008-048535 | 2/2008 |

OTHER PUBLICATIONS

Extended European Search Report for corresponding EP Application No. 14192795.4-1809, Apr. 29, 2015.
Japanese Office Action for corresponding JP Application No. 2013-236069, Sep. 15, 2015.

* cited by examiner

MATRIX CONVERTER AND METHOD FOR COMPENSATING FOR OUTPUT VOLTAGE ERROR

CROSS-REFERENCE TO RELATED APPLICATIONS

The present application claims priority under 35 U.S.C. §119 to Japanese Patent Application No. 2013-236069, filed Nov. 14, 2013. The contents of this application are incorporated herein by reference in their entirety.

BACKGROUND

1. Field of the Invention

The embodiments disclosed herein relate to a matrix converter and a method for compensating for an output voltage error.

2. Discussion of the Background

Matrix converters each include a plurality of bidirectional switches. The bidirectional switches couple the phases of an AC (Alternating Current) power supply to respective phases of a load. Each matrix converter controls the bidirectional switches to directly switch between the voltages for the phases of the AC power supply so as to output a desired voltage and a desired frequency to the load.

The bidirectional switches each include a plurality of switching elements. When the matrix converter uses the bidirectional switches to switch between the phases of the AC power supply to couple to the load, the matrix converter performs commutation control. In the commutation control, the matrix converter individually turns on or off each of the switching elements in a predetermined order. Although the commutation control prevents inter-line short-circuiting of the AC power supply and prevents opening of the output of the matrix converter, errors may occur in the output voltage.

In view of this, Japanese Unexamined Patent Application Publication Nos. 2004-7929 and 2007-82286 disclose correcting a voltage command based on the inter-line voltage of the AC power supply so as to compensate for output voltage error.

SUMMARY

According to one aspect of the present disclosure, a matrix converter includes a power converter, a command generator, and a commutation controller. The power converter includes a plurality of bidirectional switches each having a conducting direction controllable by a plurality of switching elements. The plurality of bidirectional switches are disposed between a plurality of input terminals and a plurality of output terminals. The plurality of input terminals are respectively coupled to phases of an AC power source. The plurality of output terminals are respectively coupled to phases of a load. The command generator is configured to generate a control command based on a voltage command specifying a pulse width of pulse width modulation control. The commutation controller is configured to control the plurality of switching elements by a predetermined commutation method based on the control command so as to perform commutation control. The command generator includes a corrector configured to, when an error in an output voltage is caused by the commutation control, correct the pulse width specified in the voltage command in generating the control command so as to reduce the error in the output voltage.

According to another aspect of the present disclosure, a method for compensating for an output voltage error includes generating a control command based on a voltage command specifying a pulse width of pulse width modulation control. A plurality of switching elements are controlled by a predetermined commutation method based on the control command so as to perform commutation control. The plurality of switching elements each have a controllable conducting direction and are included in a plurality of bidirectional switches. The plurality of bidirectional switches are coupled between phases of an AC power supply and phases of a load. The generating step includes, when an output voltage error is caused by the commutation control, correcting the pulse width specified in the voltage command in generating the control command so as to reduce the output voltage error.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A matrix converter according to an embodiment will be described in detail below by referring to the accompanying drawings. The following embodiment is provided for exemplary purposes only and is not intended in a limiting sense.

[1. Configuration of Matrix Converter]

Figure 1:
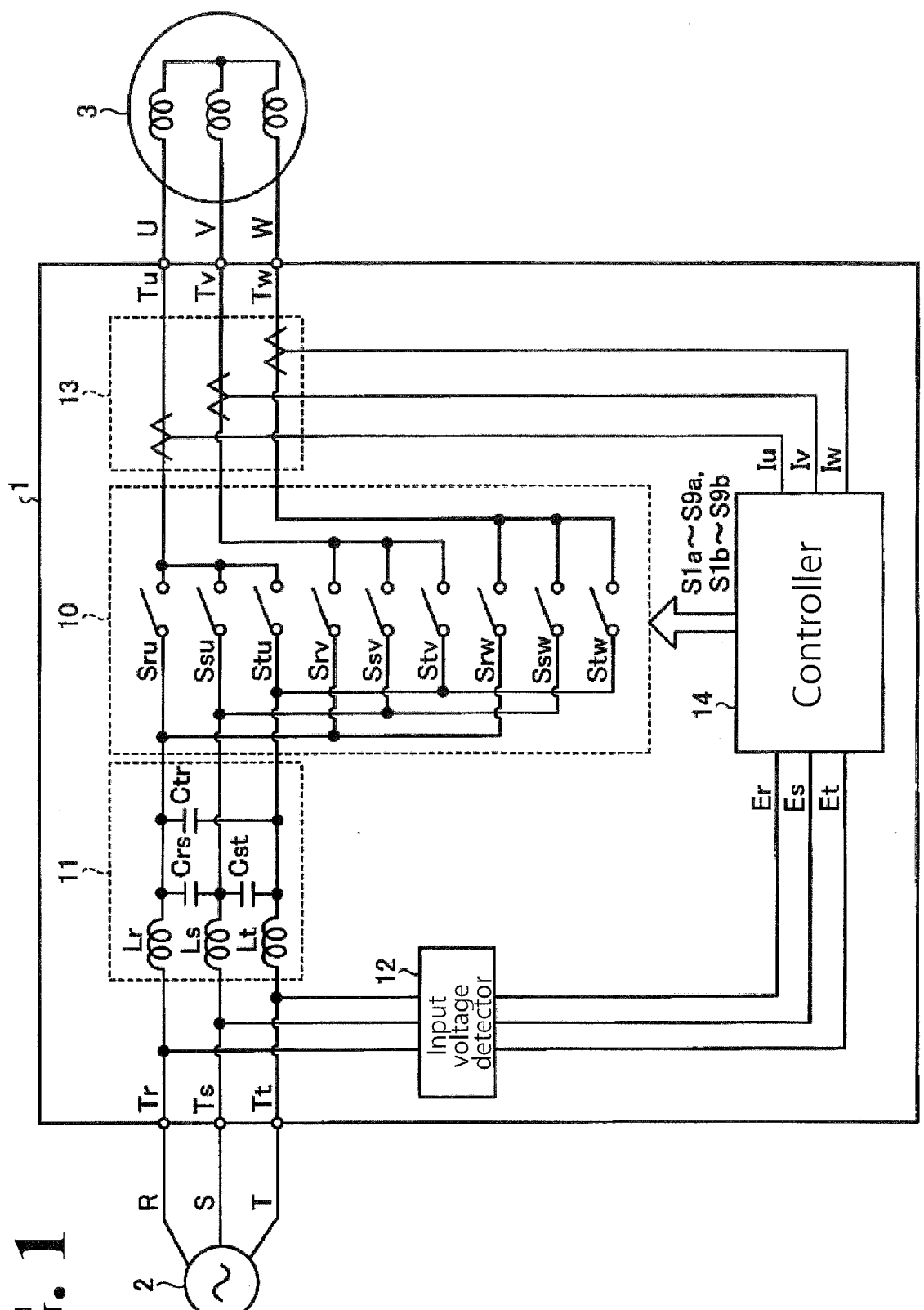
FIG. 1 illustrates an exemplary configuration of a matrix converter according to an embodiment.

FIG. 1 illustrates an exemplary configuration of a matrix converter according to an embodiment. As illustrated in FIG. 1, the matrix converter 1 according to this embodiment is disposed between a three-phase AC power supply 2 (hereinafter simply referred to as an AC power supply 2) and a load 3. Examples of the load 3 include, but are not limited to, an AC motor and an electric generator. The AC power supply 2 includes an R phase, an S phase, and a T phase. The load 3 includes a U phase, a V phase, and a W phase. In the following description, the R phase, the S phase, and the T phase will be referred to as input phases, while the U phase, the V phase, and the W phase will be referred to as output phases.

The matrix converter 1 includes input terminals Tr, Ts, and Tt, output terminals Tu, Tv, and Tw, a power converter 10, an LC filter 11, an input voltage detector 12, an output current detector 13, and a controller 14. When the AC power supply 2 supplies three-phase AC power to the matrix converter 1 through the input terminals Tr, Ts, and Tt, the matrix converter 1 converts the three-phase AC power into three-phase AC power having a desired voltage and a desired frequency. The matrix converter 1 outputs the converted three-phase AC power to the load 3 through the output terminals Tu, Tv, and Tw.

The power converter 10 includes a plurality of bidirectional switches Sru, Ssu, Stu, Srv, Ssv, Sty, Srw, Ssw, and Stw (hereinafter occasionally collectively referred to as bidirectional switch Sw). The bidirectional switch Sw couples each phase of the AC power supply 2 to a corresponding to phase of the load 3.

The bidirectional switches Sru, Ssu, and Stu respectively couple the R phase, the S phase, and the T phase of the AC power supply 2 to the U phase of the load 3. The bidirectional switches Srv, Ssv, and Sty respectively couple the R phase, the S phase, and the T phase of the AC power supply 2 to the V phase of the load 3. The bidirectional switches Srw, Ssw, and Stw respectively couple the R phase, the S phase, and the T phase of the AC power supply 2 to the W phase of the load 3.

Figure 2:
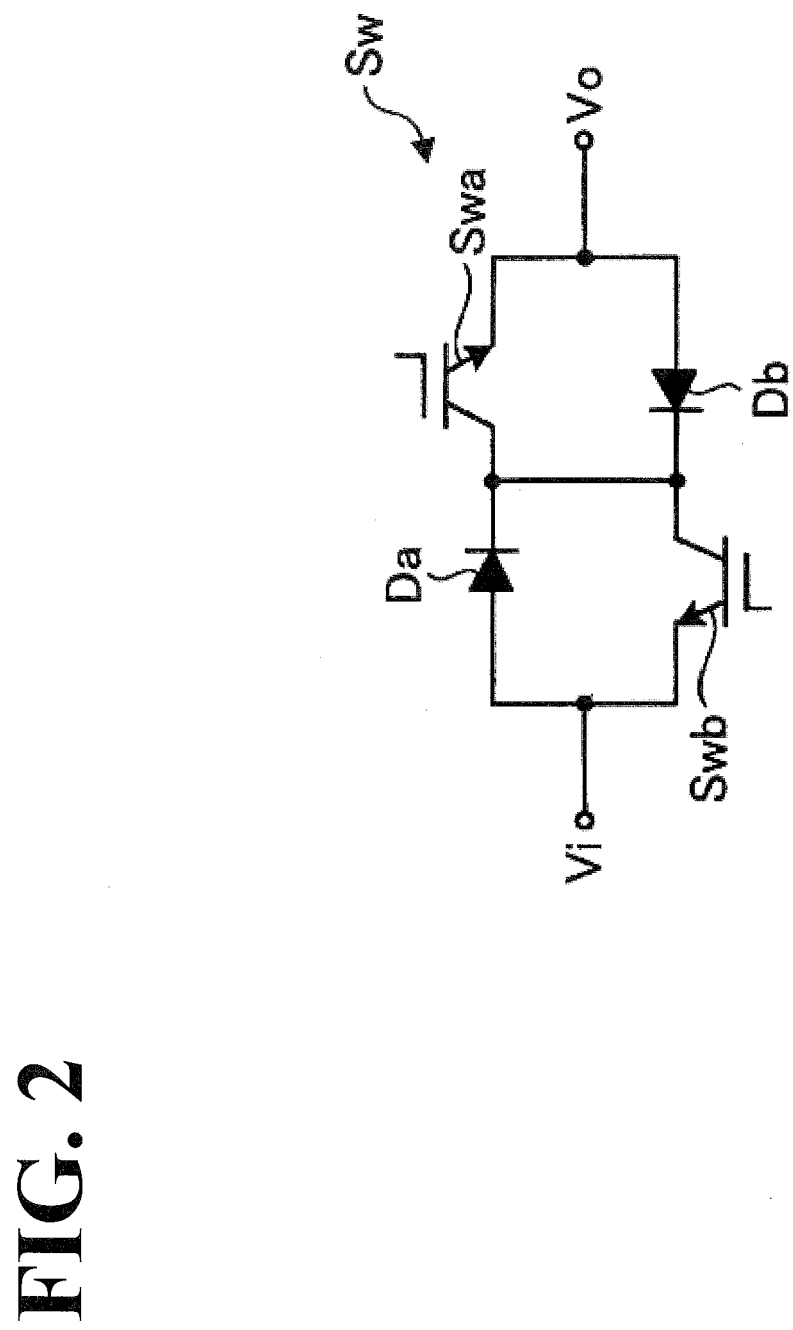
FIG. 2 illustrates an exemplary configuration of a bidirectional switch illustrated in FIG. 1.

FIG. 2 illustrates an exemplary configuration of the bidirectional switch Sw. As illustrated in FIG. 2, the bidirectional switch Sw includes two series connection circuits. One series connection circuit includes a switching element Swa and a diode Da. The other series connection circuit includes a switching element Swb and a diode Db. These series connection circuits are anti-parallely coupled to each other. In FIG. 2, input phase voltage is denoted as Vi and output phase voltage is denoted as Vo.

It is noted that the bidirectional switch Sw will not be limited to the configuration illustrated in FIG. 2 insofar as the bidirectional switch Sw includes a plurality of switching elements to control the conduction direction. While in FIG. 2 the cathode of the diode Da and the cathode of the diode Db are coupled to each other, another possible example is that the cathode of the diode Da and the cathode of the diode Dbare are not coupled to each other.

Examples of the switching elements Swa and Swb include, but are not limited to, semiconductor switching elements such as metal-oxide-semiconductor field-effect transistor (MOSFET) and insulated gate bipolar transistor (IGBT). Other examples include next generation semiconductor switching elements such as SiC and GaN. When the switching elements Swa and Swb are reverse blocking IGBTs, no diode Da or Db are necessary.

Referring back to FIG. 1, the matrix converter 1 will be further described. The LC filter 11 is disposed between the R phase, the S phase, and the T phase of the AC power supply 2 and the power converter 10. The LC filter 11 includes three reactors Lr, Ls, and Lt, and three capacitors Crs, Cst, and Ctr to remove high-frequency components caused by switching of the bidirectional switch SW.

The input voltage detector 12 detects the phase voltage of each of the R phase, the S phase, and the T phase of the AC power supply 2. Specifically, the input voltage detector 12 detects instantaneous values Er, Es, and Et (hereinafter respectively referred to as input phase voltages Er, Es, and Et) of the phase voltages of the R phase, the S phase, and the T phase of the AC power supply 2.

The output current detector 13 detects the current between the power converter 10 and the load 3. Specifically, the output current detector 13 detects instantaneous values Iu, Iv, and Iw (hereinafter respectively referred to as output phase currents Iu, Iv, and Iw) of the current between the power converter 10 and the U phase, the V phase, and the W phase of the load 3. In the following description, the output phase currents Iu, Iv, and Iw may occasionally collectively be referred to as output phase current Io.

The controller 14 generates drive signals S1a to S9a and S1b to S9b based on the input phase voltages Er, Es, and Et and based on the output phase currents Iu, Iv, and Iw. The drive signals S1a to S9a and S1b to S9b may occasionally collectively be referred to as drive signal Sg.

The drive signals S1a to S9a are input into the gate of the switching element Swa, which is a part of each of the bidirectional switches Sru, Ssu, Stu, Srv, Ssv, Sty, Srw, Ssw, and Stw. The drive signals S1b to S9b are input into the gate of the switching element Swb, which is another part of each of the bidirectional switch Sru, Ssu, Stu, Srv, Ssv, Stv, Srw, Ssw, and Stw. The controller 14 will be described in detail below.

[2. Configuration of Controller 14]

Figure 3:
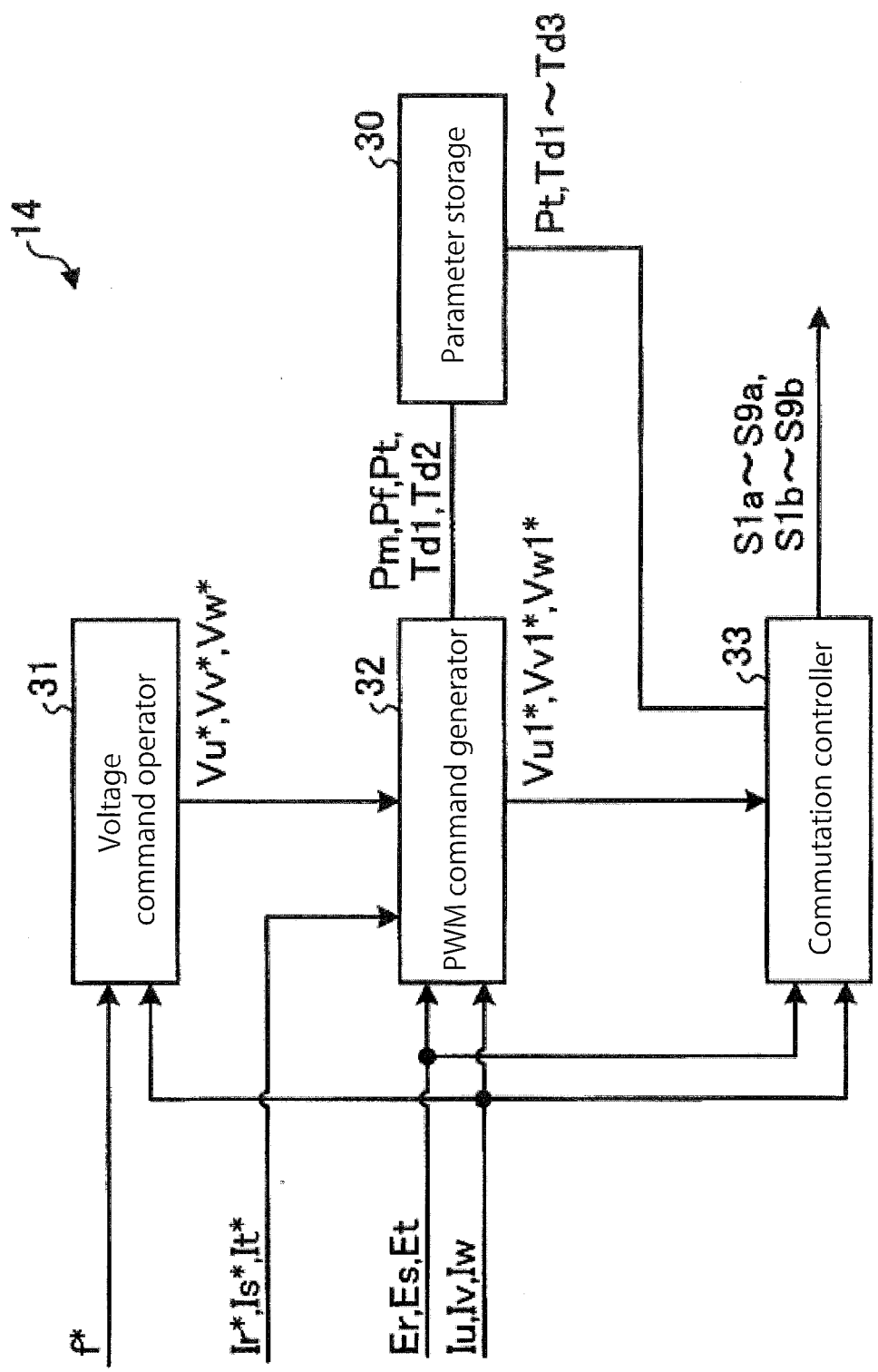
FIG. 3 illustrates an exemplary configuration of a controller illustrated in FIG. 1.

FIG. 3 illustrates an exemplary configuration of the controller 14. As illustrated in FIG. 3, the controller 14 includes a parameter storage 30, a voltage command operator 31, a PWM command generator 32, and a commutation controller 33.

The controller 14 includes a microcomputer and various circuits. The microcomputer includes a central processing unit (CPU), a read only memory (ROM), a random access memory (RAM), and an input-output port. The CPU of the microcomputer reads and executes a program stored in the ROM to function as the parameter storage 30, the voltage command operator 31, the PWM command generator 32, and the commutation controller 33. It is possible to implement the controller 14 using hardware alone, without using any programs.

The parameter storage 30 stores, for example, a modulation method parameter Pm, a carrier frequency setting parameter Pf, commutation time parameters Td1 to Td3, and a commutation method setting parameter Pt. These pieces of information are input into the parameter storage 30 by a user or a person in charge of installation through, for example, an input device (not illustrated) of the matrix converter 1.

The voltage command operator 31 generates and outputs voltage commands Vu*, Vv*, and Vw* of respective output phases (hereinafter occasionally referred to as output voltage command Vo*) at predetermined control intervals based on, for example, a frequency command f* and the output phase currents Iu, Iv, and Iw. The frequency command f* is a command indicating frequencies of the output phase voltages Vu, Vv, and Vw.

The PWM command generator 32 uses a carrier wave Sc to generate PWM (Pulse Width Modulation) control commands Vu1*, Vv1* and Vw1* based on, for example, the input phase voltages Er, Es, and Et, the output phase currents Iu, Iv, and Iw, and the voltage commands Vu*, Vv*, and Vw*. The PWM control commands Vu1*, Vv1*, and Vw1* each specify a pulse width for the PWM control.

Specifically, the PWM command generator 32 regards the input phase voltages Er, Es, and Et as input phase voltage Ep, Em, and En in descending order of magnitude. In every half-cycle of the carrier wave, the PWM command generator 32 generates the PWM control commands Vu1*, Vv1*, and Vw1* based on the voltage commands Vu*, Vv*, and Vw* by a space vector method. In the following description, the PWM control commands Vu1*, Vv1*, and Vw1* may occasionally collectively be referred to as PWM control command Vo1*.

The output voltage command Vo* is used to calculate the PWM control command Vo1*, and the PWM command generator 32 switches the output voltage command Vo* at the time corresponding to the top or valley of the carrier wave Sc. Assume that the cycle, Tsc, of the carrier wave Sc is twice the cycle of the output voltage command Vo*. In this case, the PWM command generator 32 switches the output voltage command Vo*, which is used to calculate the PWM control command Vo1*, in every two cycles of the carrier wave Sc at the time corresponding to the top or valley of the carrier wave Sc.

Figure 4:
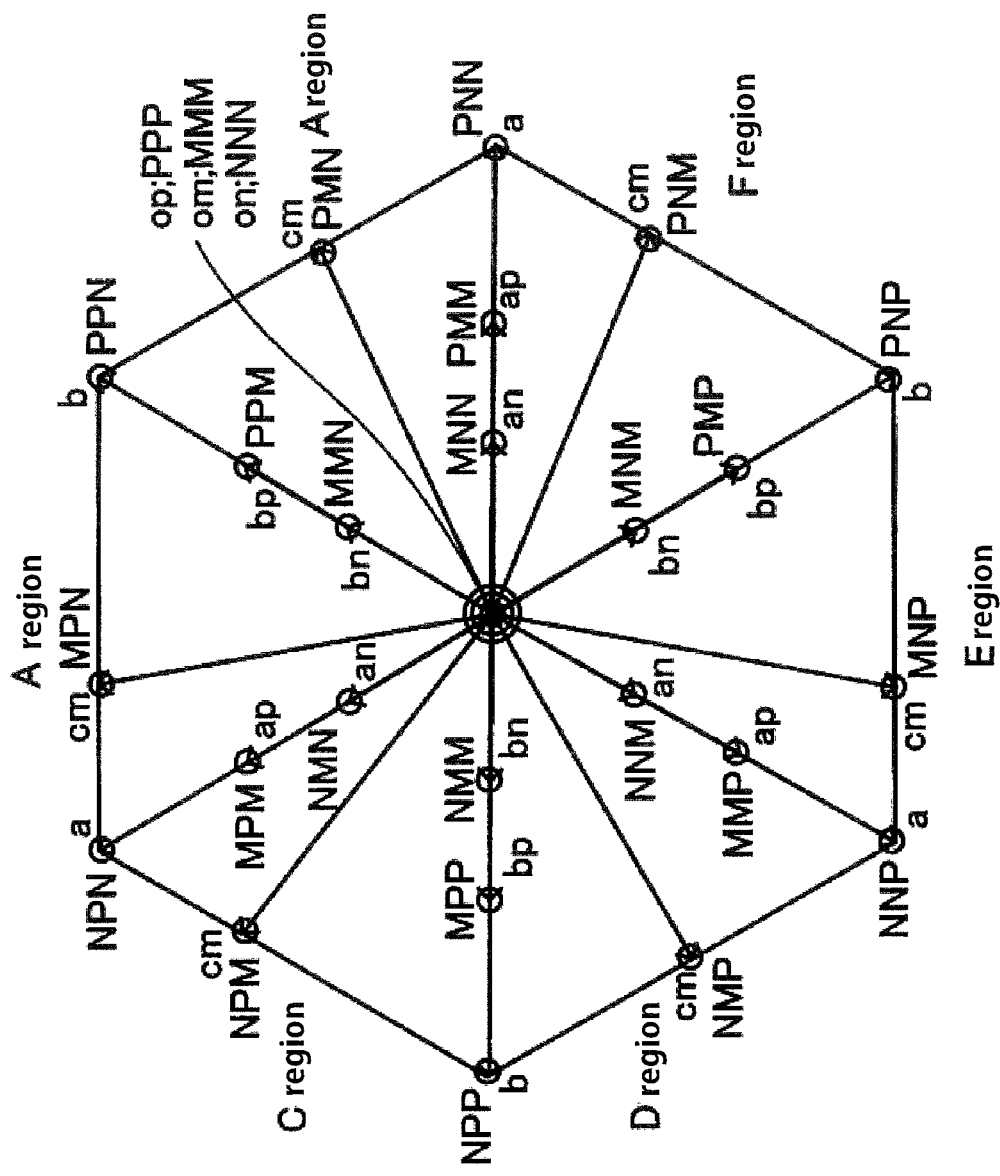
FIG. 4 illustrates exemplary output voltage space vectors.

FIG. 4 illustrates exemplary output voltage space vectors. As illustrated in FIG. 4, each output voltage space vector is for the R phase, the S phase, and the T phase with a maximum voltage phase denoted as P, a minimal voltage phase denoted as N, and an intermediate voltage phase denoted as M.

In FIG. 4, the vector expression "a vector" denotes a state in which any one of the output phases U, V, and W is coupled to the maximum voltage phase P while the rest of the output phases U, V, and W are coupled to the minimal voltage phase N. The vector expression "b vector" denotes a state in which any one of the output phases is coupled to the minimal voltage phase N while the rest of the output phases are coupled to the maximum voltage phase P. For example, when the U phase is coupled to the maximum voltage phase P while the V phase and the W phase are coupled to the minimal voltage phase N, this state is denoted as PNN, which is an "a vector". Similarly, NPN and NNP are "a vectors". PPN, PNP, and NPP are "b vectors".

The vector expressions "ap vector", "an vector", "bp vector", and "bn vector" each denote a state in which one or some of the output phases is or are coupled to the intermediate voltage phase M. For example, the "ap vector" denotes a state in which any one of the output phases is coupled to the maximum voltage phase P while the rest of the output phases are coupled to the intermediate voltage phase M. The "an vector" denotes a state in which any one of the output phases is coupled to the intermediate voltage phase M while the rest of the output phases are coupled to the minimal voltage phase N. The "bp vector" denotes a state in which any two of the output phases are coupled to the maximum voltage phase P while the other one of the output phases is coupled to the intermediate voltage phase M. The "bn vector" denotes a state in which any two of the output phases are coupled to the intermediate voltage phase M while the other one of the output phases is coupled to the minimal voltage phase N. It is noted that a=ap+an, and b=bp+bn.

The vector expression "cm vector" denotes a state in which the U phase, the V phase, and the W phase are coupled to different input phases. The vector expressions "on vector", "om vector", and "op vector" denote a state in which all the U phase, V phase, and W phase are coupled to the same input phase. The vector expression "on vector" denotes a state in which all the output phases are coupled to the minimal voltage phase N. The vector expression "om vector" denotes a state in which all the output phases are coupled to the intermediate voltage phase M. The vector expression "op vector" denotes a state in which all the output phases are coupled to the maximum voltage phase P.

Figure 5:
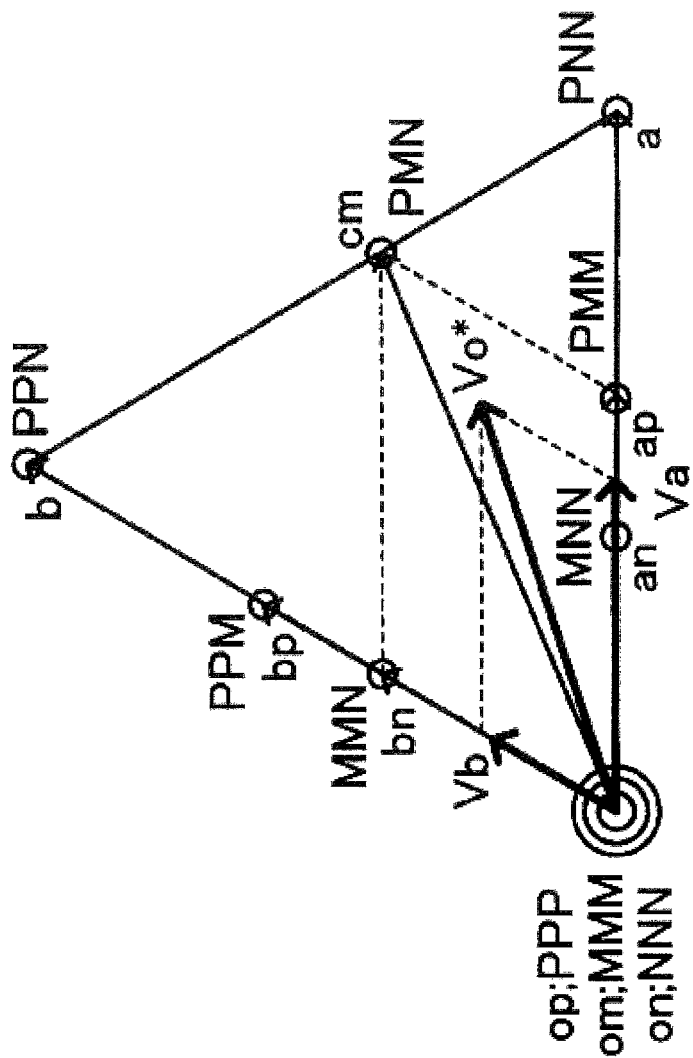
FIG. 5 illustrates an exemplary relationship between an output voltage command and space vectors.

FIG. 5 illustrates an exemplary relationship between the output voltage command Vo* and the space vectors. As illustrated in FIG. 5, the PWM command generator 32 generates the PWM control command Vo1* based on a switching pattern that is a combination of output vectors selected from among the "a vector", the "ap vector", the "an vector", the "b vector", the "bp vector", the "bn vector", the "cm vector", the "op vector", the "om vector", and the "on vector" so as to output an "a vector component Va" and a "b vector component Vb" of the output voltage command Vo*.

When the PWM control command Vo1* is changed, the commutation controller 33 performs commutation control to switch the phase of the AC power supply 2 coupled to the load 3 at the bidirectional switch Sw, and generates a drive signal Sg.

The commutation controller 33 uses a commutation pattern including a plurality of steps to perform the commutation control. The plurality of steps include a step of actually switching the output phase voltage Vo in response to a change in the PWM control command Vo1*. This step varies depending on whether the output phase voltage Vo is to be decreased or increased. This creates a possibility of an error between the PWM control command Vo1* and the actual output phase voltage Vo. In view of this, the PWM command generator 32 performs an error compensation to correct the pulse width specified in the PWM control command Vo1* so as to reduce the error in the output phase voltage Vo caused by the commutation control performed by the commutation controller 33.

The PWM command generator 32 performs the error compensation in accordance with the type of the commutation method or the type of the modulation method of power conversion. The commutation method, the modulation method, and the error compensation will be described in detail below.

[3. Commutation Control Method]

Examples of the method of commutation performed by the commutation controller 33 include, but are not limited to, a current commutation method and a voltage commutation method. The commutation controller 33 selects the current commutation method or the voltage commutation method in accordance with a commutation setting parameter Pt, which is stored in the parameter storage 30. By the selected commutation method, the commutation controller 33 performs the commutation control. When Pt=0, for example, the commutation controller 33 selects the current commutation method, while when Pt=1, the commutation controller 33 selects the voltage commutation method.

[3.1. Current Commutation Method]

The current commutation method is a method of commutation performed on an individual output phase basis in accordance with a commutation pattern corresponding to the polarity of the output phase current Io. Here, a 4-step current commutation method will be described as an example of the current commutation method performed by the commutation controller 33.

In order to prevent short-circuiting between the input phases and prevent opening of the output phases, the commutation control using the 4-step current commutation method is based on a commutation pattern of the following steps 1 to 4 in accordance with the polarity of the output phase current Io.

Step 1: Turn OFF one switching element, among the switching elements of the bidirectional switch Sw serving as the switching source, that has a polarity opposite to the polarity of the output phase current Io in terms of the conduction direction.

Step 2: Turn ON one switching element, among the switching elements of the bidirectional switch Sw serving as the switching destination, that has the same polarity as the polarity of the output phase current Io in terms of the conduction direction.

Step 3: Turn OFF one switching element, among the switching elements of the bidirectional switch Sw serving as the switching source, that has the same polarity as the polarity of the output phase current Io in terms of the conduction direction.

Step 4: Turn OFF one switching element, among the switching elements of the bidirectional switch Sw serving as the switching destination, that has a polarity opposite to the polarity of the output phase current Io in terms of the conduction direction.

Figure 6:
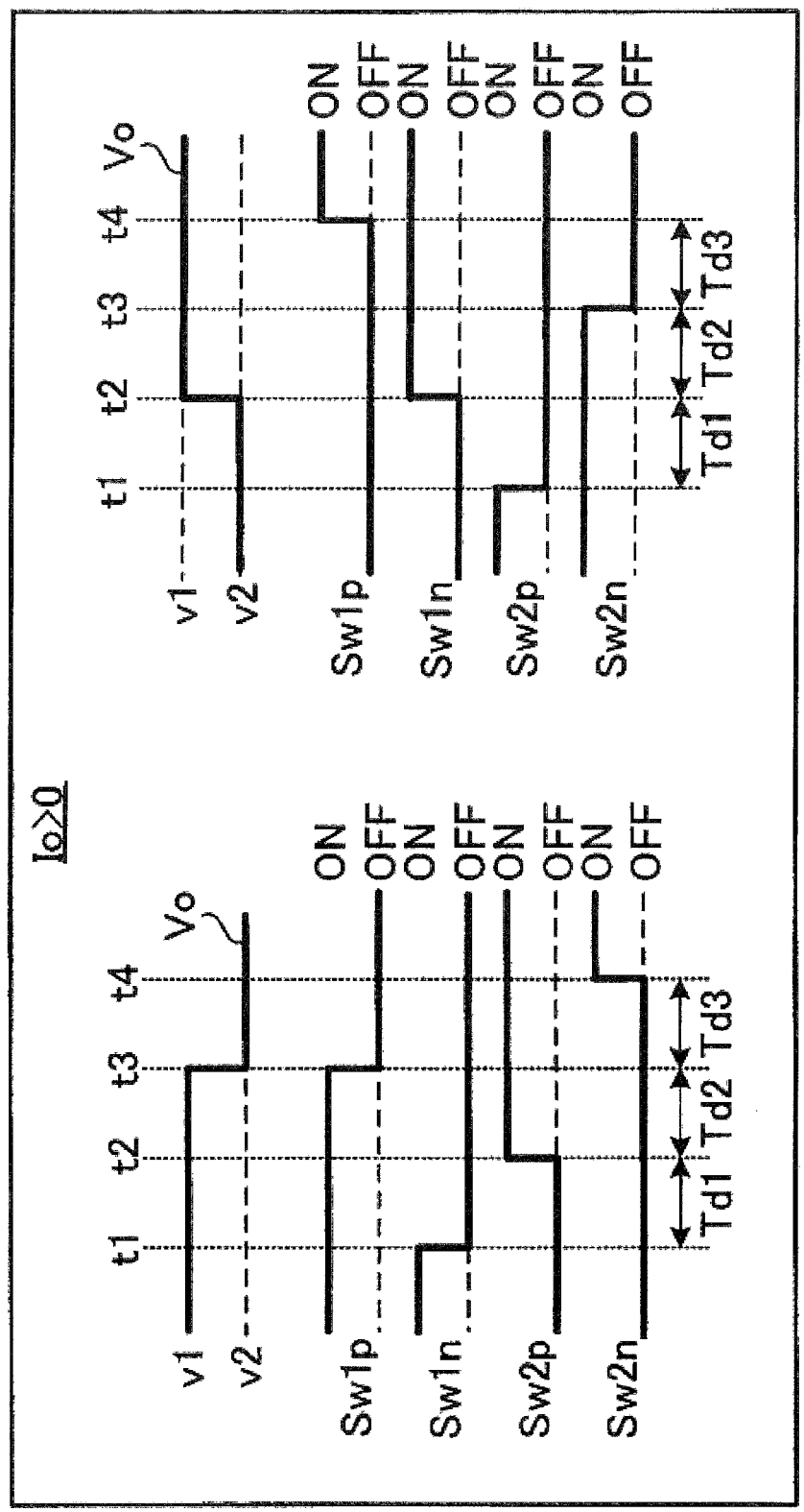
FIG. 6 illustrates an on-off transition of a switching element in a 4-step current commutation method at Io>0.

FIG. 6 illustrates an on-off transition of a switching element in the 4-step current commutation method at Io>0. Switching elements Sw1$p$ and Sw1$n$ respectively denote switching elements Swa and Swb of the bidirectional switch Sw serving as the switching source. Switching element Sw2$p$ and Sw2$n$ respectively denote switching elements Swa and Swb of the bidirectional switch Sw serving as the switching destination. Reference signs v1 and v2 each denote input phase voltage Vi and have the relationship v1>v2.

As illustrated in FIG. 6, when the input phase voltage Vi at Io>0 is switched from v1 to v2, the output phase voltage Vo is switched at the timing when step 3 is performed (timing t3). When the input phase voltage Vi at Io>0 is switched from v2 to v1, the output phase voltage Vo is switched at the timing when step 2 is performed (timing t2).

Figure 7:
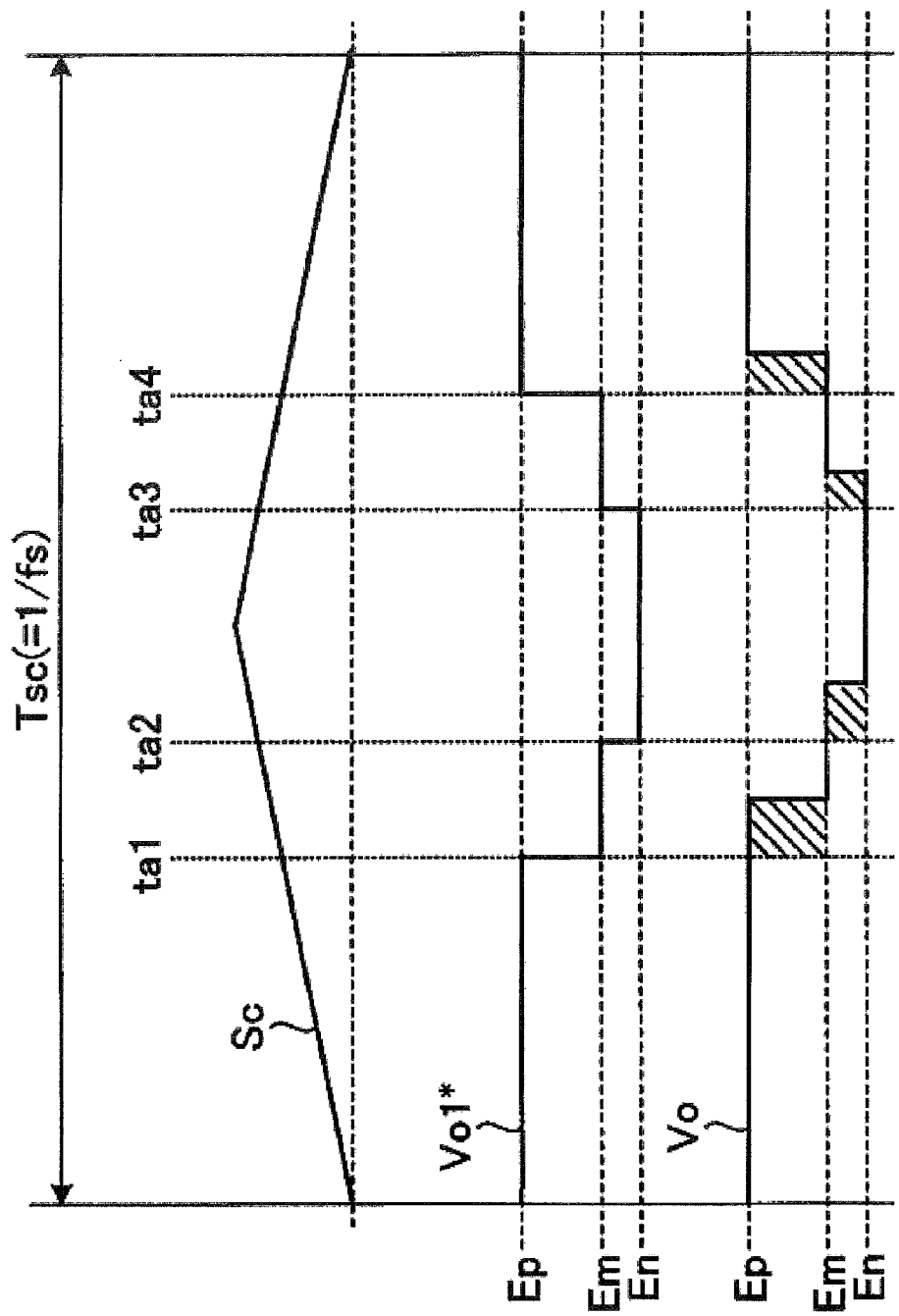
FIG. 7 illustrates a relationship between a PWM control command, an output phase voltage, and a carrier wave in the 4-step current commutation method at Io>0.

FIG. 7 illustrates a relationship between the PWM control command Vo1*, the output phase voltage Vo, and the carrier wave Sc in the 4-step current commutation method at Io>0. As illustrated in FIG. 7, the output phase voltage Vo is not switched at the timing when the input phase voltage Vi is switched as specified in the PWM control command Vo1*.

Specifically, the output phase voltage Vo is switched at the timings when step 3 is performed after timings ta1 and ta2, and at the timings when step 2 is performed after timings ta3 and timing ta4. Thus, an error of (Ep−En)×Td2/Tsc occurs in the output phase voltage Vo with respect to the PWM control command Vo1* in one cycle Tsc of the carrier wave Sc.

Figure 8:
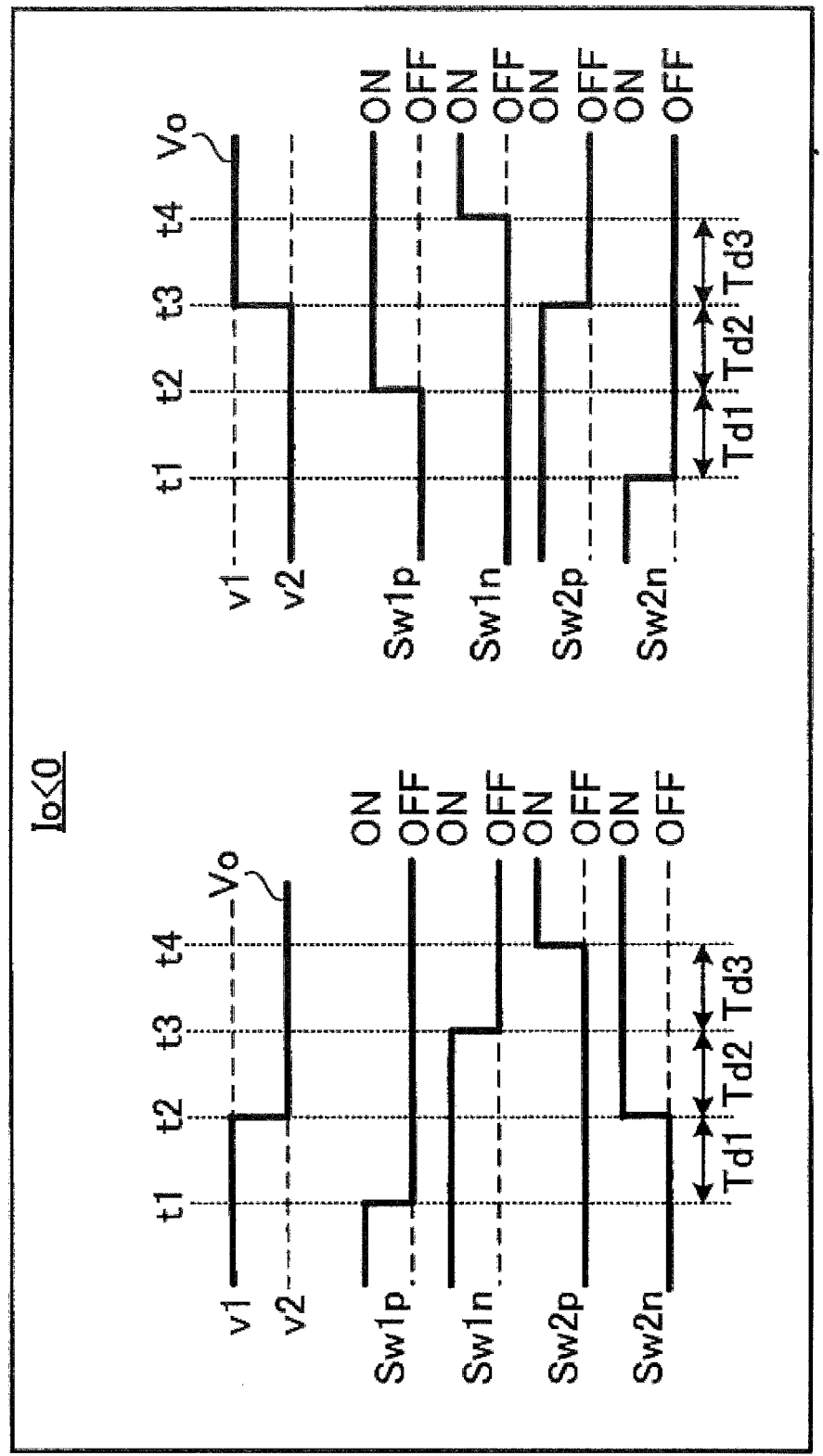
FIG. 8 illustrates an on-off transition of the switching element in the 4-step current commutation method at Io<0.

At Io<0, the timing when the input phase voltage Vi output to the output phase is switched is different from the timing at Io>0. FIG. 8 illustrates an on-off transition of the switching element in the 4-step current commutation method at Io<0.

When the input phase voltage Vi at Io<0 is switched from v1 to v2 as illustrated in FIG. 8, the output phase voltage Vo is switched at the timing when step 2 is performed (timing t2). When the input phase voltage Vi at Io<0 is switched from v2 to v1, the output phase voltage Vo is switched at the timing when step 3 is performed (timing t3).

Figure 9:
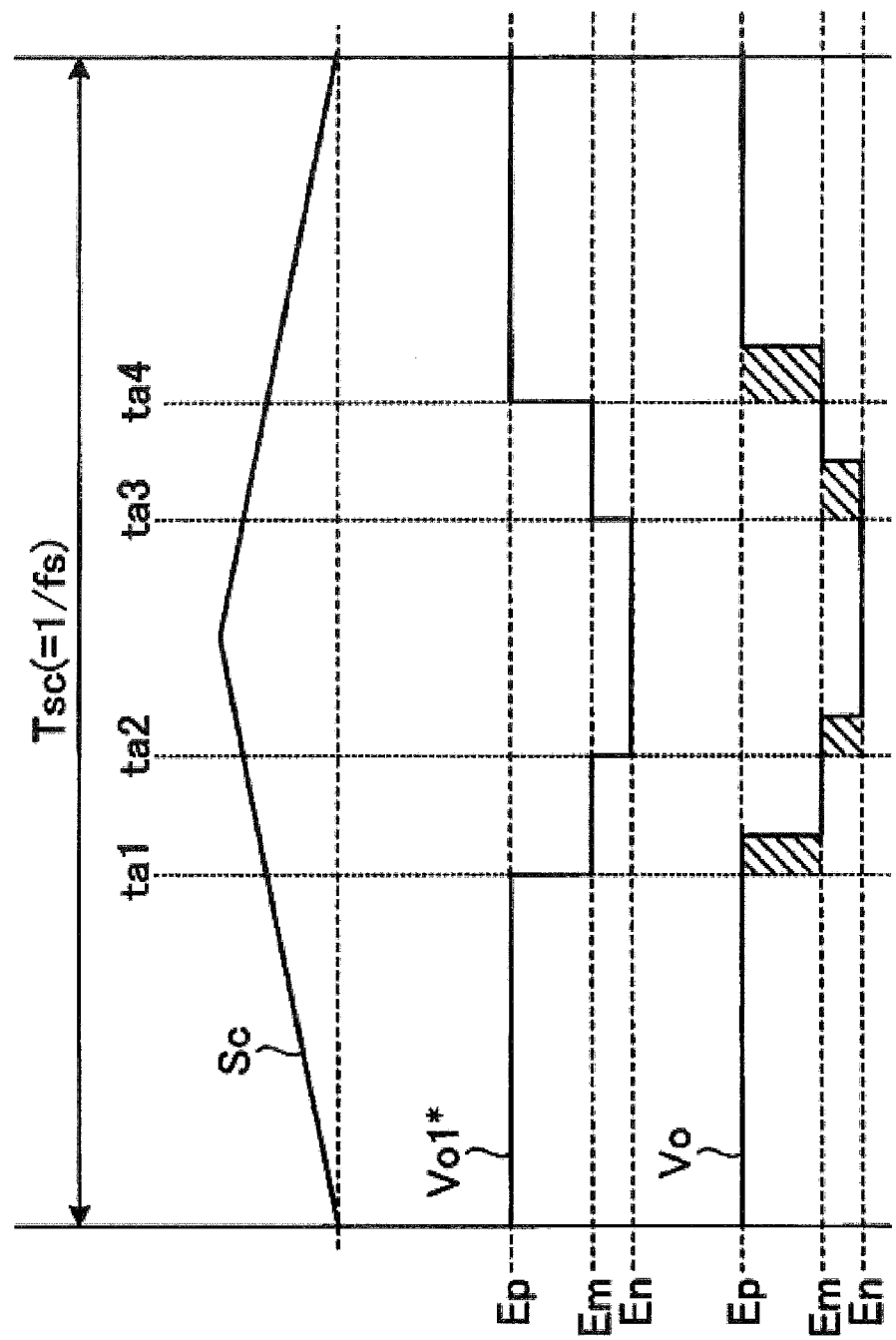
FIG. 9 illustrates a relationship between a PWM control command, an output phase voltage, and a carrier wave in the 4-step current commutation method at Io<0.

FIG. 9 illustrates a relationship between the PWM control command Vo1*, the output phase voltage Vo, and the carrier wave Sc in the 4-step current commutation method at Io<0. As illustrated in FIG. 9, the output phase voltage Vo is not switched at the timing when the input phase voltage Vi is switched as specified in the PWM control command Vo1* similarly to the case at Io>0.

Specifically, the output phase voltage Vo is switched at the timings when step 2 is performed after timings ta1 and ta2, and at the timings when step 3 is performed after timings ta3 and timing ta4. Thus, an error of −(Ep−En)×Td2/Tsc occurs in the output phase voltage Vo with respect to the PWM control command Vo1* in one cycle Tsc of the carrier wave Sc.

Thus, in the commutation control using the current commutation method, the timing at which the output phase voltage Vo is changed varies depending on whether the voltage is increasing (v2 to v1) or decreasing (v1 to v2). This causes the output phase voltage Vo to have an error (hereinafter referred to as an output voltage error Voerr) with respect to the PWM control command Vo1*, and causes the polarity of the output voltage error Voerr to vary depending on the polarity of the output phase current Io.

[3.2. Voltage Commutation Method]

The voltage commutation method is a method of commutation performed based on a commutation pattern that depends on a relationship of magnitude of the input phase voltages Er, Es, and Et. Here, a 4-step voltage commutation method will be described as an example of the voltage commutation method performed by the commutation controller 33.

In order to prevent short-circuiting between the input phases and prevent opening of the output phases, the commutation control using the 4-step voltage commutation method is based on a commutation pattern of the following steps 1 to 4 in accordance with a relationship of magnitude of the input phase voltages Er, Es, and Et. The commutation pattern in the 4-step voltage commutation method has no dependency on the polarity of the output phase current Io.

Step 1: Turn ON a reverse biased switching element in a switching destination.

Step 2: Turn OFF a reverse biased switching element in a switching source.

Step 3: Turn ON a forward biased switching element in the switching destination.

Step 4: Turn OFF a forward biased switching element in the switching source.

In the switching element Swa, the reverse bias refers to a state where the input side voltage is lower than the output side voltage immediately before the commutation control. The forward bias refers to a state where the input side voltage is higher than the output side voltage immediately before the commutation control. In the switching element Swb, the forward bias refers to a state where the input side voltage is lower than the output side voltage immediately before the commutation control. The reverse bias refers to a state where the input side voltage is higher than the output side voltage immediately before the commutation control.

Figure 10:
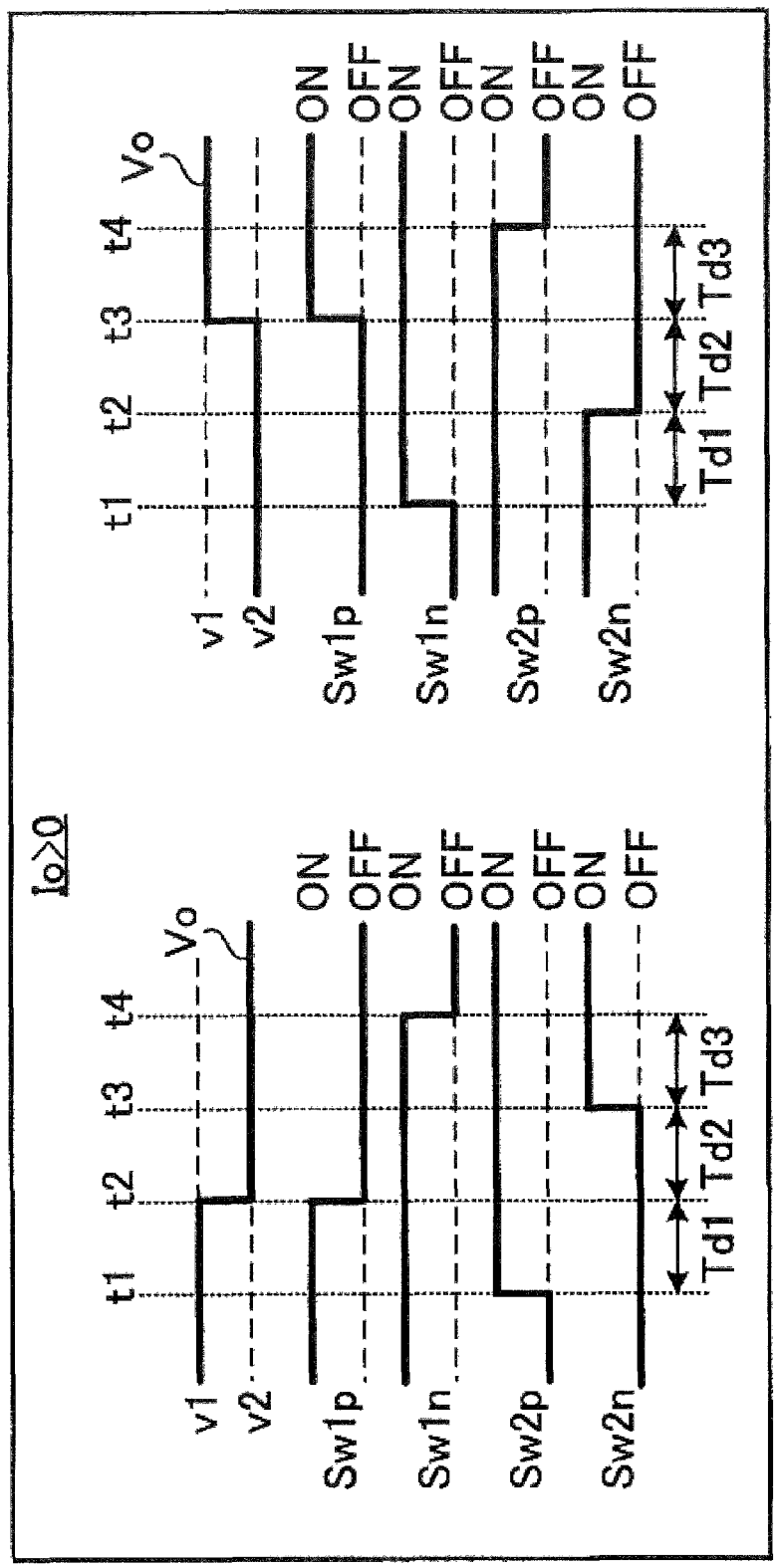
FIG. 10 illustrates an on-off transition of the switching element in the 4-step voltage commutation method at Io>0.
Figure 11:
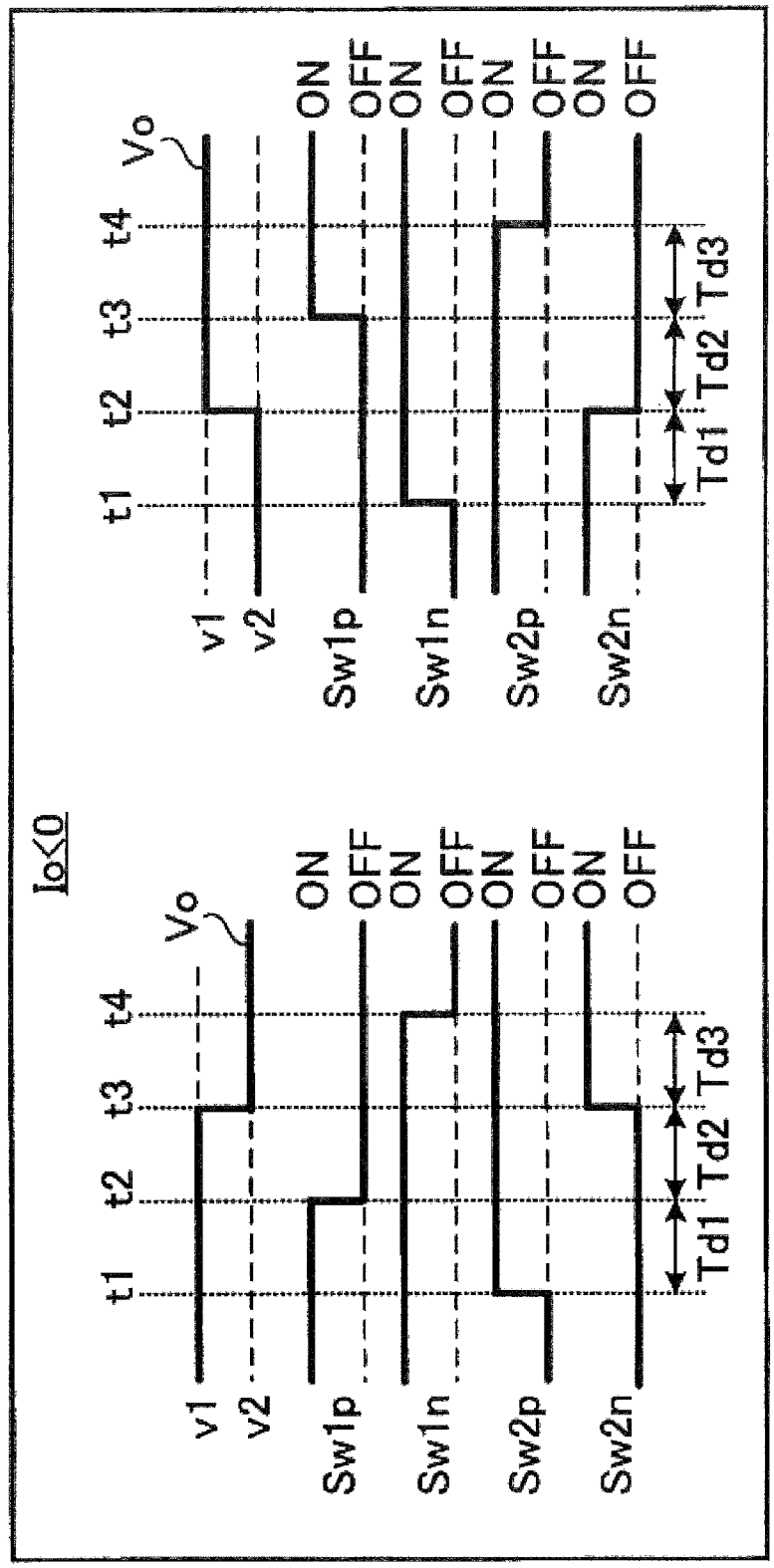
FIG. 11 illustrates an on-off transition of the switching element in the 4-step voltage commutation method at Io<0.

FIGS. 10 and 11 illustrate an on-off transition of the switching element in the 4-step voltage commutation method. The switching elements Sw1$p$, Sw1$n$, Sw2$p$, and Sw2$n$, and the voltages v1 and v2 are similar to those illustrated in FIGS. 6 and 8.

When the input phase voltage Vi at Io>0 is switched from v1 to v2 as illustrated in FIG. 10, the output phase voltage Vo is switched at the timing when step 2 is performed (timing t2). When the input phase voltage Vi at Io>0 is switched from v2 to v1, the output phase voltage Vo is switched at the timing when step 3 is performed (timing t3). Thus, the output voltage error Voerr in the case of the voltage commutation method at Io>0 is similar to the output voltage error Voerr in the case of the current commutation method at Io<0 (see FIG. 9). Namely, the output voltage error Voerr is −(Ep−En)×Td2/Tsc.

When the input phase voltage Vi at Io<0 is switched from v1 to v2 as illustrated in FIG. 11, the output phase voltage Vo is switched at the timing when step 3 is performed (timing t3). When the input phase voltage Vi at Io<0 is switched from v2 to v1, the output phase voltage Vo is switched at the timing when step 2 is performed (timing t2). Thus, the output voltage error Voerr in the case of the voltage commutation method at Io<0 is similar to the output voltage error Voerr in the case of the current commutation method at Io>0 (see FIG. 7). Namely, the output voltage error Voerr is (Ep−En)×Td2/Tsc.

Thus, the commutation control using the voltage commutation method is similar to the commutation control using the current commutation method in that the timing at which the output phase voltage Vo is changed varies depending on whether the voltage is increasing (v2 to v1) or decreasing (v1 to v2). This causes the output phase voltage Vo to have an output voltage error Voerr with respect to the PWM control command Vo1*, and causes the polarity of the output voltage error Voerr to vary depending on the polarity of the output phase current Io. In addition, the polarity of the output voltage error Voerr with respect to the polarity of the output phase current Io is different between the voltage commutation method and the current commutation method.

[4. Method of Power Conversion Modulation]

Examples of the method of power conversion modulation performed by the PWM command generator 32 include, but are not limited to, a two-phase modulation method and a three-phase modulation method. The PWM command generator 32 selects one of the two-phase modulation method and the three-phase modulation method based on the modulation parameter Pm stored in the parameter storage 30, and generates the PWM control command Vo1* based on the selected method. For example, when Pm=0, the PWM command generator 32 selects the two-phase modulation method. When Pm=1, the PWM command generator 32 selects the three-phase modulation method. The following description will be under the assumption that Vu>Vv>Vw.

[4.1. Two-Phase Modulation Method]

The two-phase modulation method is a method by which the input phase voltage of one output phase among the U phase, the V phase, and the W phase is fixed to the base voltage Ebase, while the input phase voltages of the rest two output phases are switched between Ep, Em, and En. In the two-phase modulation method, the switching pattern varies depending on the base voltage Ebase and on the phase of the input phase voltage Vi. The PWM command generator 32 regards as the base voltage Ebase an input phase voltage Vi with the greatest absolute value among the input phase voltages Er, Es, and Et.

Figure 12:
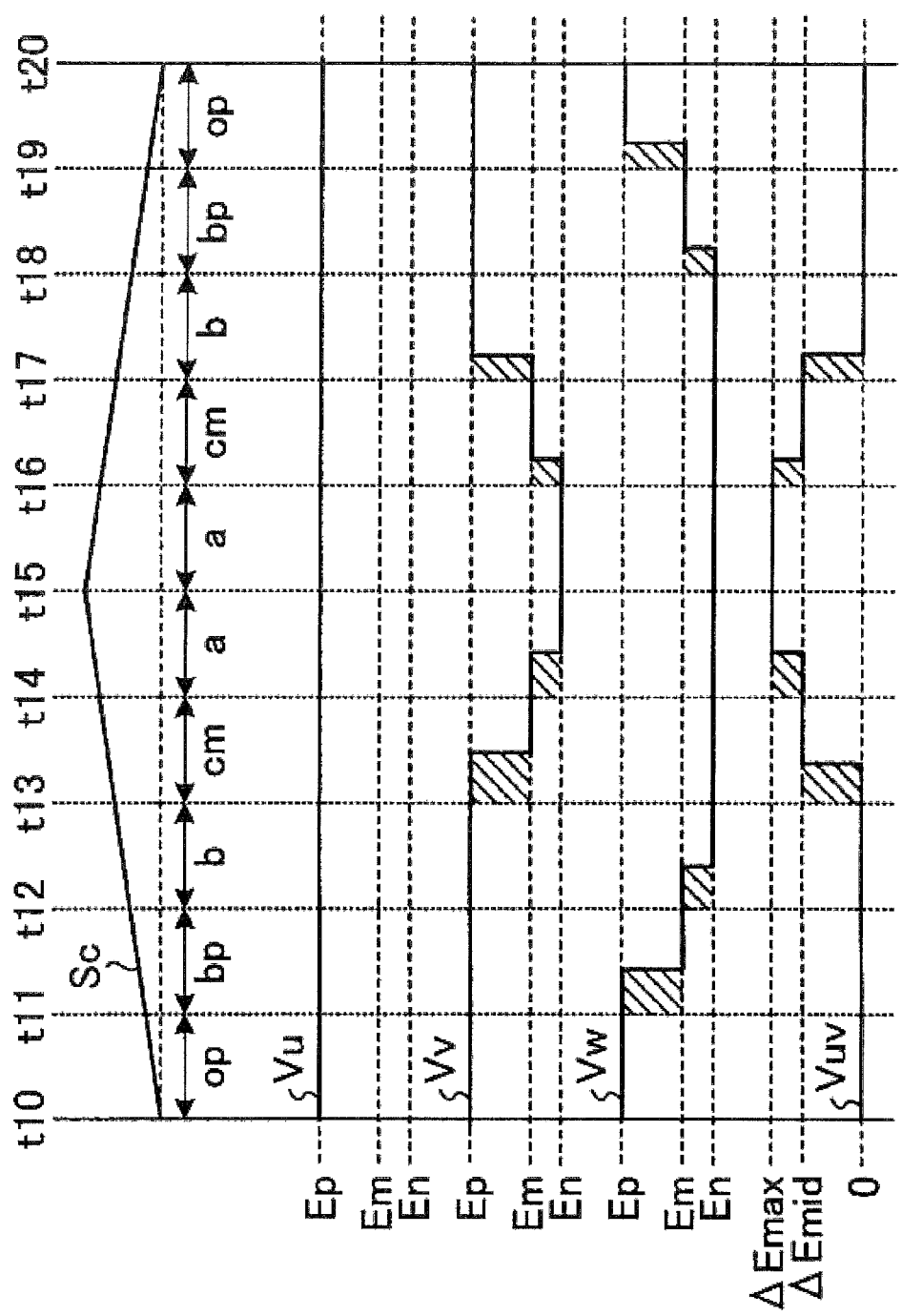
FIG. 12 illustrates an exemplary switching pattern (pattern 1) at Ebase=Ep.
Figure 13:
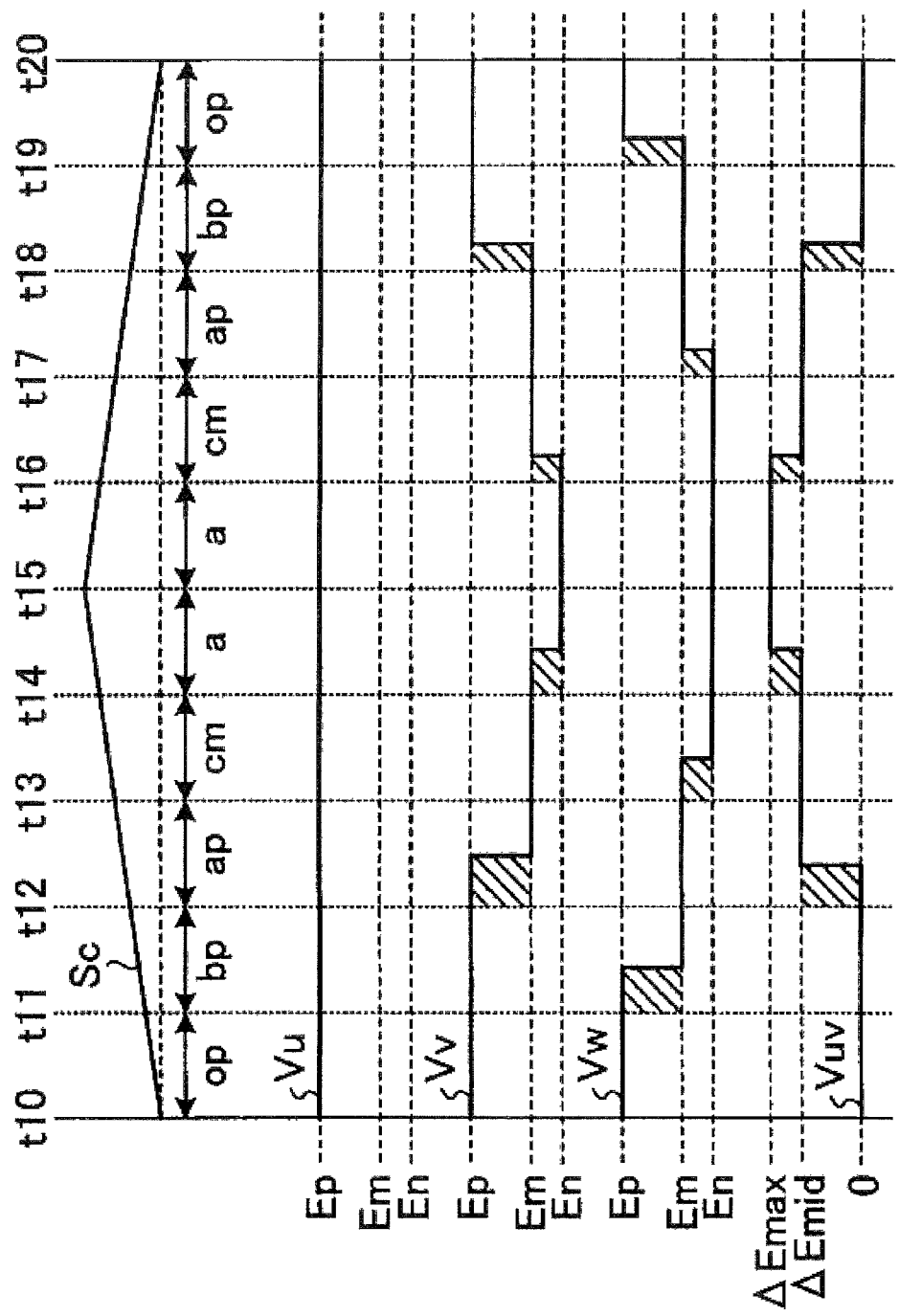
FIG. 13 illustrates an exemplary switching pattern (pattern 2) at Ebase=Ep.
Figure 14:
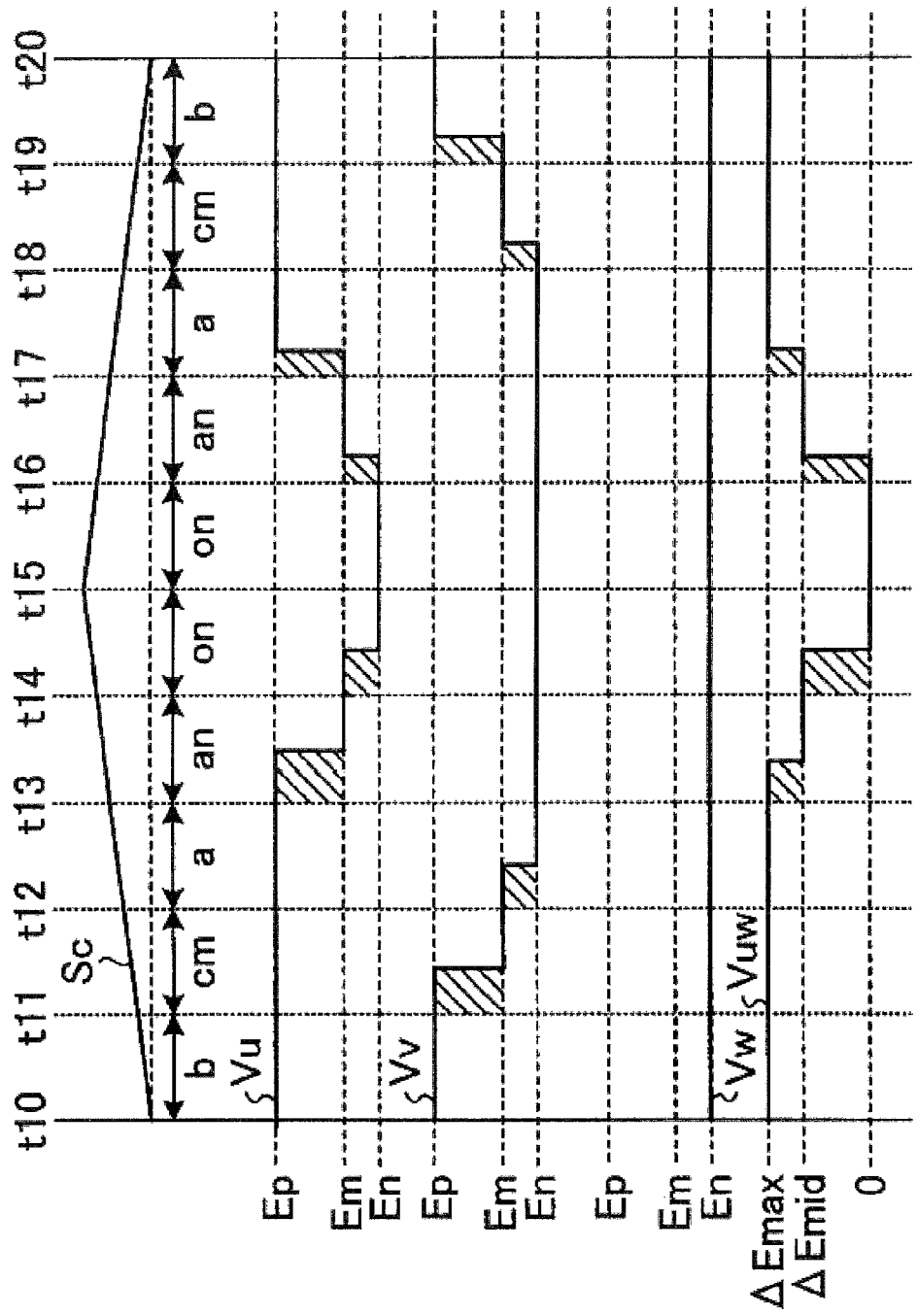
FIG. 14 illustrates an exemplary switching pattern (pattern 1) at Ebase=En.
Figure 15:
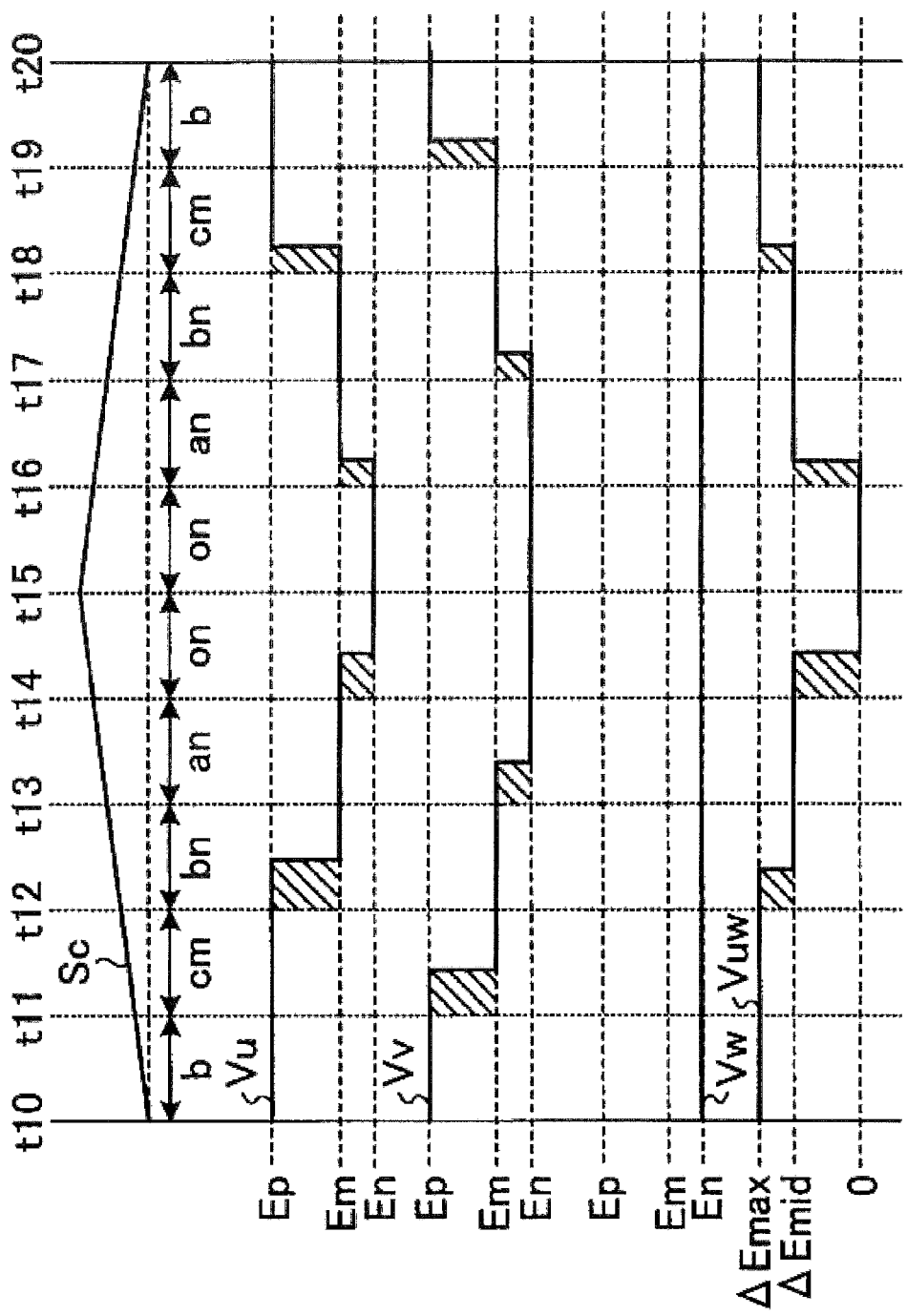
FIG. 15 illustrates an exemplary switching pattern (pattern 2) at Ebase=En.

FIGS. 12 to 15 illustrate a relationship between the carrier wave Sc, the output phase voltages Vu, Vv, and Vw, and the base voltage Ebase in the two-phase modulation method. FIGS. 12 and 13 illustrate an exemplary switching pattern at Ebase=Ep. FIGS. 14 and 15 illustrate an exemplary switching pattern at Ebase=En.

FIGS. 12 and 14 each illustrate such a switching pattern that the input phase voltage output to one output phase is continuous switched, and then the input phase voltage output to another output phase is continuous switched. FIGS. 13 and 15 each illustrate such a switching pattern that the input phase voltage output to one output phase and the input phase voltage output to another output phase are alternately switched. Based on the input phase voltage Vi, the PWM command generator 32 switches the switching patterns illustrated in FIGS. 12 and 14 and the switching patterns illustrated in FIGS. 13 and 15.

Thus, the two-phase modulation method includes four switching patterns that depend on the base voltage Ebase and the phase of the input phase voltage Vi.

[4.2. Three-Phase Modulation Method]

The three-phase modulation method is a method by which the input phase voltages at all the output phases U phase, V phase, and W phase are switched between Ep, Em, and En. The three-phase modulation method has a single switching pattern.

Figure 16:
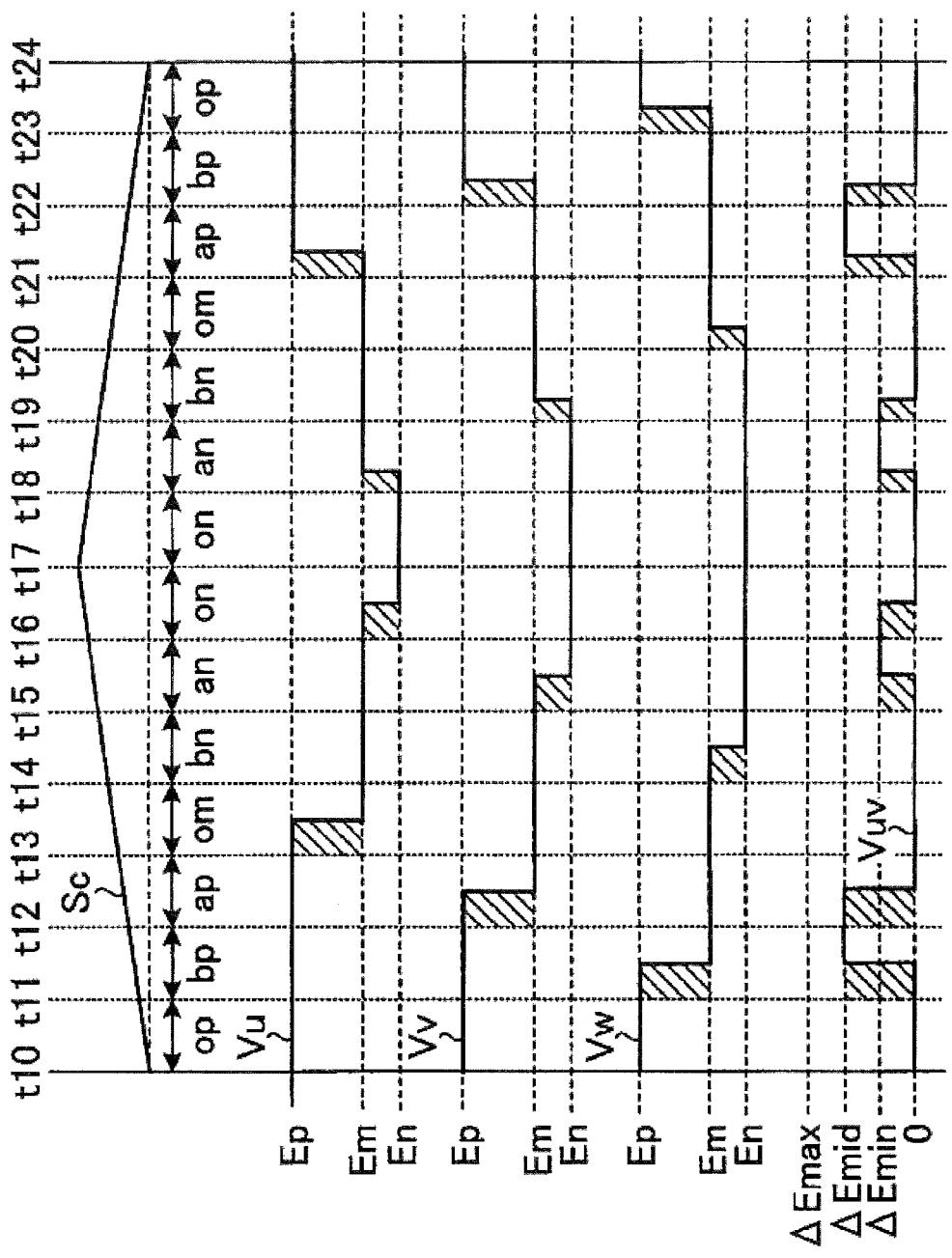
FIG. 16 illustrates an exemplary relationship between a carrier wave and an output phase voltage in a three-phase modulation method.

FIG. 16 illustrates an exemplary relationship between the carrier wave Sc and the output phase voltages Vu, Vv, and Vw in the three-phase modulation method. As illustrated in FIG. 16, in the three-phase modulation method, the power converter 10 outputs PWM pulse voltage to the U phase, the V phase, and the W phase. In the PWM pulse voltage, the input phase voltage Vi changes in the following manner Ep→Em→Em→En→En→Em→Em→Ep. FIG. 16 illustrates a state of commutation control using the current commutation method at Io>0.

[5. Adjustment of Timing]

As described above, in the two-phase modulation method, the switching pattern varies depending on the base voltage Ebase and on the phase of the input phase voltage Vi, and the output voltage error Voerr varies depending on the type of the commutation method and on the polarity of the output phase current Io.

In view of this, the PWM command generator 32 calculates a compensation amount to compensate for the output voltage error Voerr in accordance with the type of the commutation method and the polarity of the output phase current Io. The output voltage error Voerr is proportional to the timing difference that occurs in the commutation control between the decrease in the output phase voltage Vo and the increase in the output phase voltage Vo. In view of this, the PWM command generator 32 calculates a compensation amount that corresponds to the timing difference that occurs in the commutation control between the decrease in the output phase voltage Vo and the increase in the output phase voltage Vo. The PWM command generator 32 uses the compensation amount to perform a correction that corresponds to the switching pattern so as to adjust the timing at which to start the commutation control, thereby reducing the output voltage error Voerr.

Figure 17:
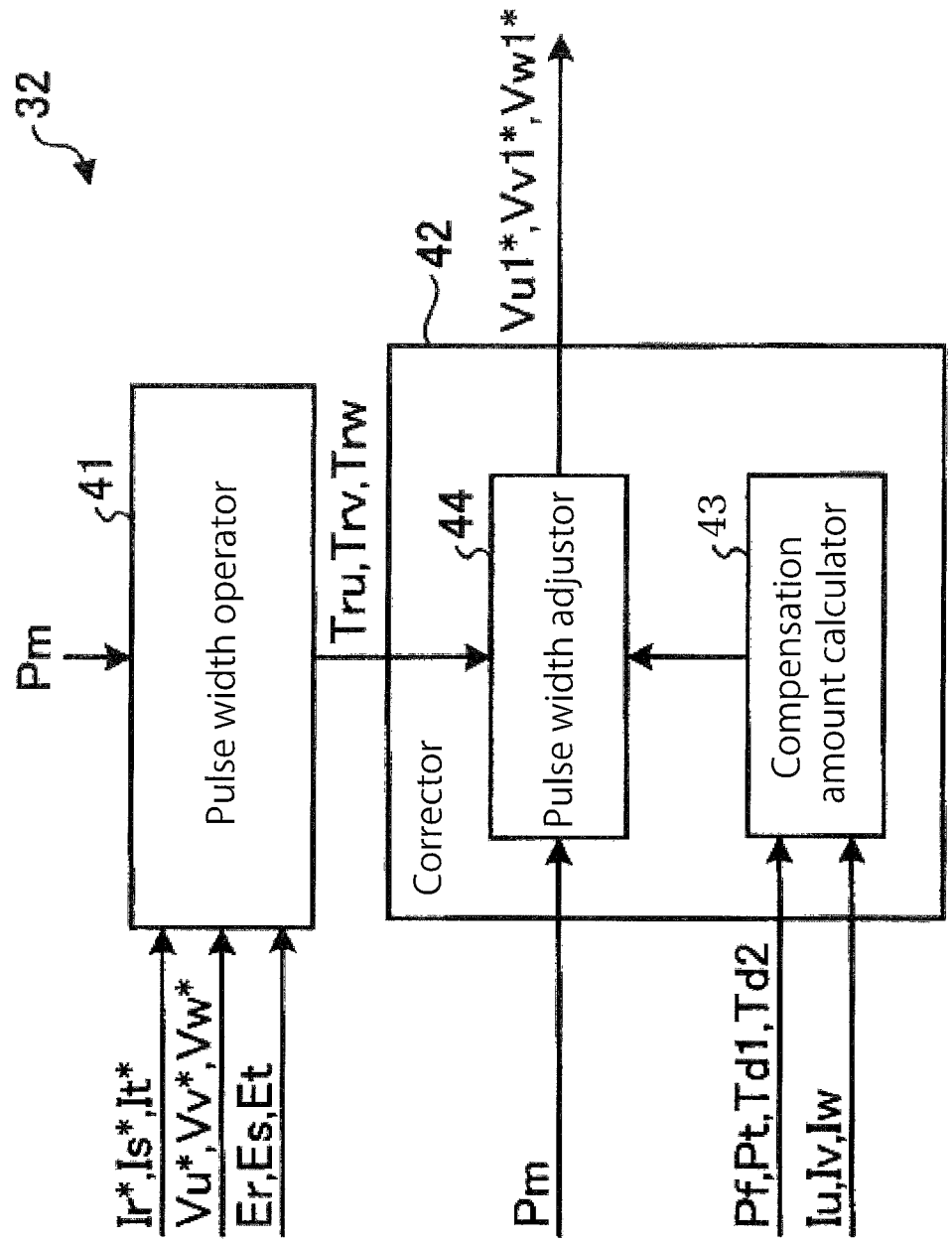
FIG. 17 illustrates an exemplary configuration of a PWM command generator.

FIG. 17 illustrates an exemplary configuration of the PWM command generator 32. As illustrated in FIG. 17, the PWM command generator 32 includes a pulse width operator 41 and a corrector 42.

The pulse width operator 41 calculates the a vector component Va and b vector component Vb (see FIG. 5) based on following exemplary Formulae (1) and (2), where Vmax represents a maximum value, Vmid represents an intermediate value, and Vmin represents a minimal value among the output voltage commands Vu*, Vv*, and Vw*.

$$|Va| = Vmax - Vmid \quad (1)$$

$$|Vb| = Vmid - Vmin \quad (2)$$

When the base voltage Ebase is Ep, the pulse width operator 41 calculates a current division ratio α based on the following exemplary Formula (3). When the base voltage Ebase is En, the pulse width operator 41 calculates the current division ratio α based on the following exemplary Formula (4). In Formulae (3) and (4), Ip, Im, and In are among the input current commands Ir*, Is*, and It*, and respectively represent current command values of phases corresponding to the input phase voltages Ep, Em, and En.

$$\alpha = Im/In \quad (3)$$

$$\alpha = Im/Ip \quad (4)$$

The input current commands Ir*, Is*, and It* are generated in an input power control section (not illustrated) of the controller 14 based on, for example, a positive phase voltage, an inverse phase voltage, and a set power factor command. The input current commands Ir*, Is*, and It* cancel out the influence of imbalance voltage and control the power factor of input current at a desired value.

The parameter storage 30 stores a modulation method parameter Pm. When the modulation method parameter Pm denotes the two-phase modulation, the pulse width operator 41 selects one switching pattern among four types of switching patterns illustrated in Table 1. Specifically, the pulse width operator 41 selects the switching pattern based on whether the base voltage Ebase is the input phase voltage Ep or En, and based on whether the phase state of the input phase voltage Vi satisfies |Vb|−α|Va|>0. Based on the voltage commands Vu*, Vv*, and Vw*, the pulse width operator 41 calculates a ratio of each of the output vectors constituting the selected switching pattern.

When, for example, the pulse width operator 41 has selected the switching pattern with pattern number "1", the pulse width operator 41 calculates Top, Tbp, Tb, Tcm, and Ta in a carrier valley-to-top half-cycle of the carrier wave Sc. Top, Tbp, Tb, Tcm, and Ta respectively represent the ratio of the "op vector", the ratio of the "bp vector", the ratio of the "b vector", the ratio of the "cm vector", and the ratio of the "a vector".

amount calculator 43 calculates the compensation amount to compensate for the output voltage error Voerr. Specifically, the compensation amount calculator 43 calculates compensation amounts Tcp(max), Tcp(mid), and Tcp(min) based on the type of the commutation method, the polarity of the output phase current Io, the commutation times Td1 and Td2, and the number of valleys and tops of the carrier wave Sc in a correction amount calculation cycle Tc.

Tcp(max) is a compensation amount with respect to the maximum output voltage phase. Tcp(mid) is a compensation amount with respect to the intermediate output voltage phase. Tcp(min) is a compensation amount with respect to the minimal output voltage phase. The maximum output voltage phase is an output phase corresponding to the Vmax. The intermediate output voltage phase is an output phase corresponding to Vmid. The minimal output voltage phase is an output phase corresponding to Vmin. In the following description, Tcp(max), Tcp(mid), and Tcp(min) will be collectively referred to as Tcp(o). In the correction amount calculation cycle Tc, the number of tops of the carrier wave Sc will be referred to as Cy, the number of valleys of the carrier wave Sc will be referred to as Ct, and the number of the tops and the valleys of the carrier wave Sc will be referred to as Cyt.

The correction amount calculation cycle Tc is the same as the cycle at which the voltage command operator 31 calculates the output voltage command Vo*. Thus, the compensa-

TABLE 1

| | Switching pattern | | |
|---|---|---|---|
| Condition | Carrier half-cycle (valley → top) | Carrier half-cycle (top → valley) | Pattern number |
| Ebase ≥ 0, \|Vb\| − α\|Va\| ≥ 0 | op → bp → b → cm → a | a → cm → b → bp → op | 1 |
| Ebase ≥ 0, \|Vb\| − α\|Va\| < 0 | op → bp → ap → cm → a | a → cm → ap → bp → op | 2 |
| Ebase < 0, \|Vb\| − α\|Va\| ≥ 0 | b → cm → a → an → on | on → an → a → cm → b | 3 |
| Ebase < 0, \|Vb\| − α\|Va\| < 0 | a → cm → bn → an → on | on → an → bn → cm → a | 4 |

When the modulation method parameter Pm denotes the three-phase modulation, the pulse width operator 41 selects the switching pattern illustrated in Table 2. Based on the voltage commands Vu*, Vv*, and Vw*, the pulse width operator 41 calculates the ratio of each of the output vectors constituting the selected switching pattern.

tion amount Tcp(o) is calculated at each cycle of calculation of the output voltage command Vo*. This improves the accuracy of the compensation amount Tcp(o). It is noted that the correction amount calculation cycle Tc may be 1/n (n is a natural number) of the cycle of calculation of the output voltage command Vo*.

TABLE 2

| Switching pattern | |
|---|---|
| Carrier half-cycle (valley → top) | Carrier half-cycle (top → valley) |
| op → bp → ap → om → bn → an → on | on → an → bn → om → ap → bp → op |

The pulse width operator 41 generates control information Tru, Trv, and Trw, each specifying the ratio of each of the output vectors constituting the selected switching pattern. Each control information specifies pattern number. The pulse width operator 41 outputs the ratio and the control information to the corrector 42. Based on the ratio of each output vector, the pulse width of the PWM pulse voltage output from the power converter 10 is set.

Figure 18:
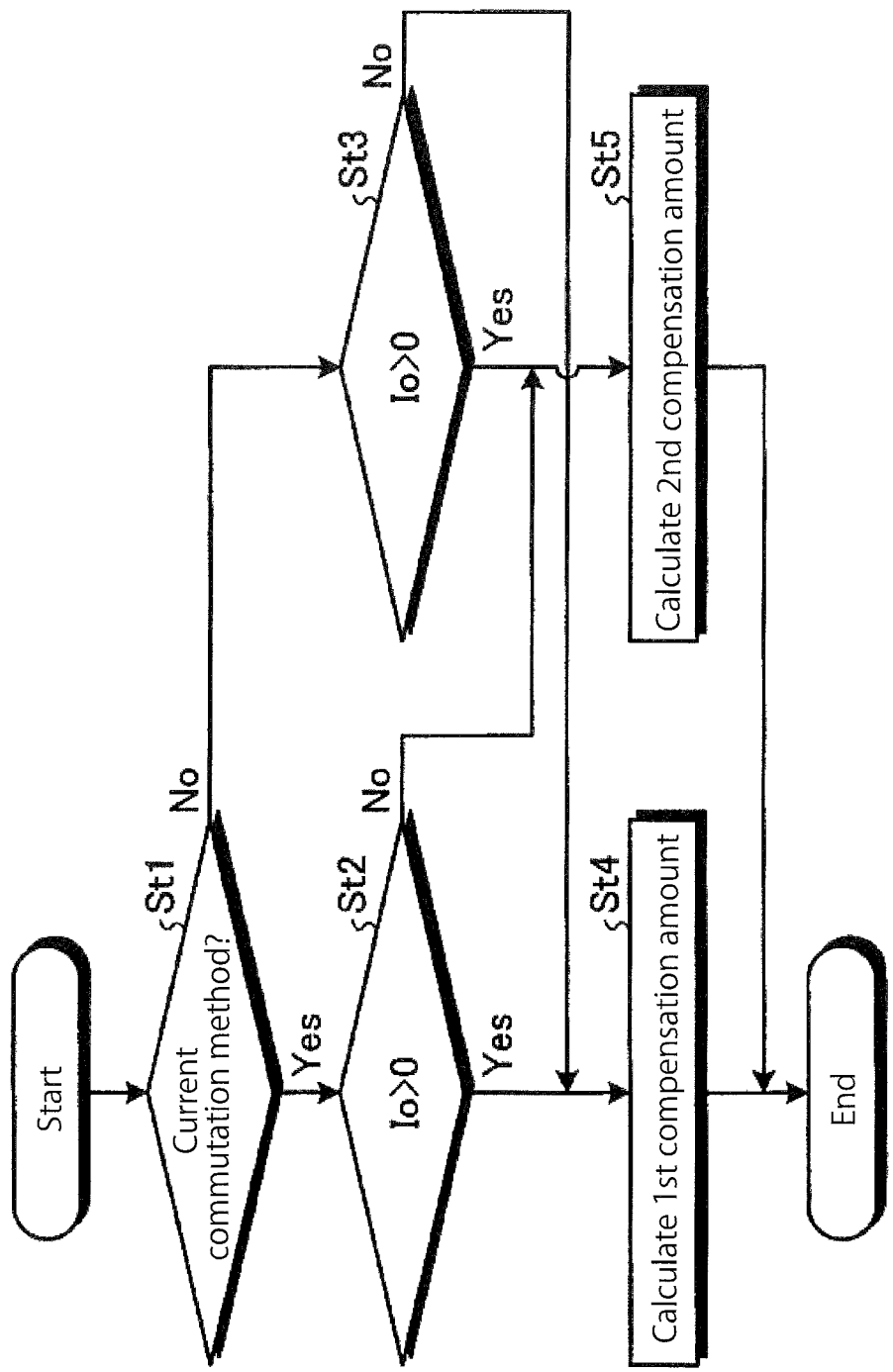
FIG. 18 is a flowchart of an example of compensation amount calculation processing performed by a compensation amount calculator.

The corrector 42 includes a compensation amount calculator 43 and a pulse width adjustor 44. The compensation By referring to FIG. 18, detailed description will be made with regard to compensation amount calculation performed by the compensation amount calculator 43. FIG. 18 is a flowchart of an example of compensation amount calculation processing performed by the compensation amount calculator 43. The compensation amount calculation is performed for each of the output phases, namely, the U phase, the V phase, and the W phase.

As illustrated in FIG. 18, the compensation amount calculator 43 determines whether the commutation method is the current commutation method based on the commutation method setting parameter Pt stored in the parameter storage 30 (step St1).

When the compensation amount calculator 43 determines that the commutation method is the current commutation method (step St1; Yes), the compensation amount calculator 43 determines whether the polarity of the output phase current Io is positive (step St2). For example, in the compensation amount calculation processing for the U phase, the compensation amount calculator 43 determines whether the polarity of the output phase current Iu is positive.

When at step St1 the compensation amount calculator 43 determines that the commutation method is the voltage commutation method instead of the current commutation method (step St1; No), the compensation amount calculator 43 determines whether the polarity of the output phase current Io is positive (step St3), similarly to the processing at step St2.

When at step St2 the compensation amount calculator 43 determines that the polarity of the output phase current Io is positive (step St2; YES), or when the compensation amount calculator 43 determines that the polarity of the output phase current Io is not positive (step St3; No), the compensation amount calculator 43 performs first compensation amount calculation processing (step St4). At step St4, the compensation amount calculator 43 performs the first compensation amount calculation processing using, for example, the following Formula (5) to obtain the compensation amount Tcp(o).

$$Tcp(o) = \frac{(Td1 + Td2) \cdot Ct - Tdl \cdot Cy}{Cyt} \quad (5)$$

When at step St2 the compensation amount calculator 43 determines that the polarity of the output phase current Io is not positive (step St2; No), or when the compensation amount calculator 43 determines that the polarity of the output phase current Io is positive (step St3; YES), the compensation amount calculator 43 performs second compensation amount calculation processing (step St5). At step St5, the compensation amount calculator 43 performs the second compensation amount calculation processing using, for example, the following Formula (6) to obtain the compensation amount Tcp(o).

$$Tcp(o) = \frac{Tdl \cdot Ct - (Td1 + Td2) \cdot Cy}{Cyt} \quad (6)$$

Figure 19:
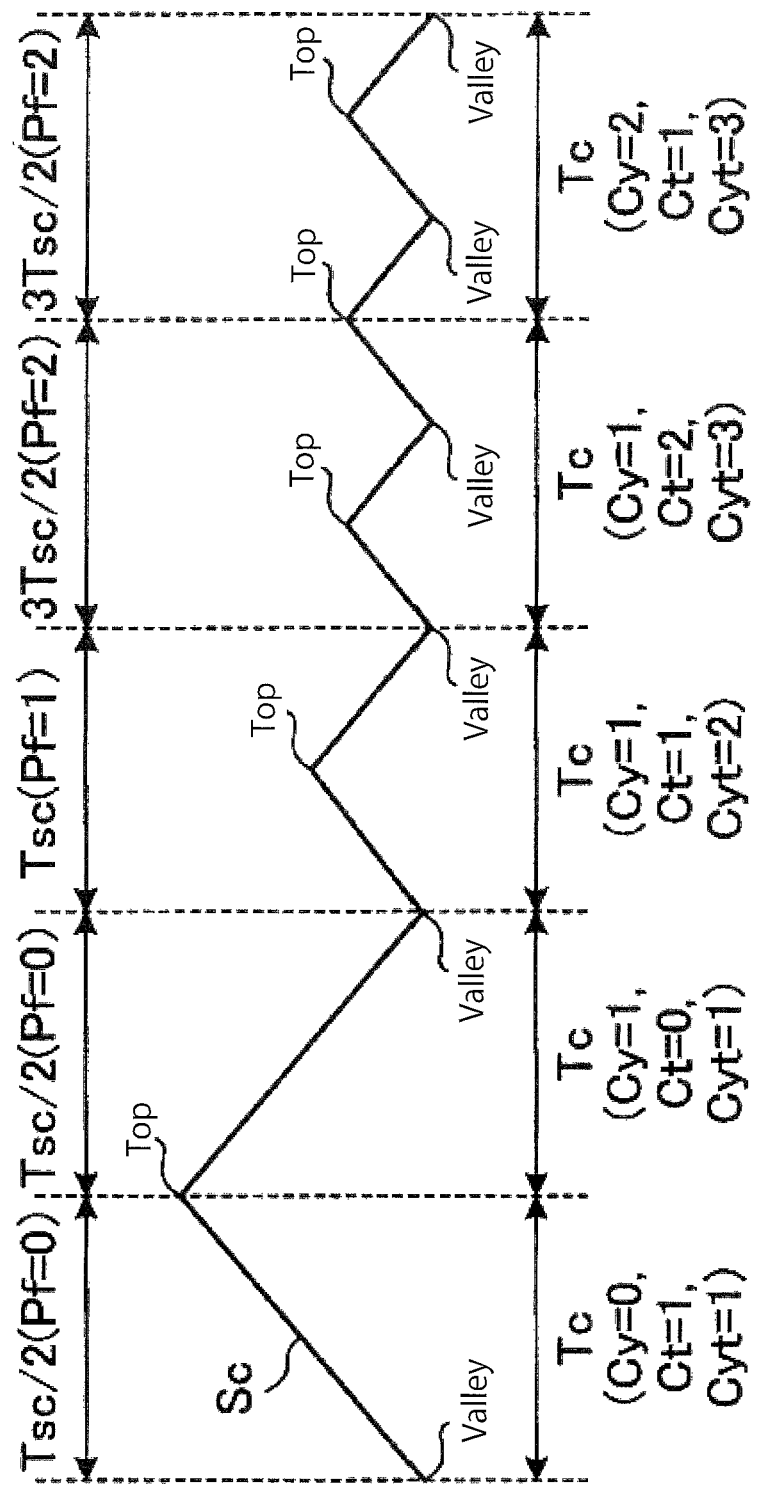
FIG. 19 illustrates an exemplary relationship between a carrier wave and a correction amount calculation cycle.

Thus, the compensation amount calculator 43 calculates the compensation amount Tcp(o) for each output phase based on the type of the commutation method, based on the output phase current Io, and based on the number of tops and valleys of the carrier wave Sc in the correction amount calculation cycle Tc. The compensation amount calculator 43 calculates Cy, Ct, and Cyt based on, for example, the carrier frequency setting parameter Pf. For example, when Pf=0 as illustrated in FIG. 19, then Tc=Tsc/2, Cy=0, Ct=1, and Cyt=1, or Tc=Tsc/2, Cy=1, Ct=0, and Cyt=1. When Pf=1, then Tc=Tsc, Cy=1, Ct=1, and Cyt=2. When Pf=2, then Tc=3Tsc/2, Cy=1, Ct=2, and Cyt=3, or Tc=3Tsc/2, Cy=2, Ct=1, and Cyt=3. FIG. 19 illustrates an exemplary relationship between the carrier wave Sc and the correction amount calculation cycle Tc.

Based on the switching pattern selected by the pulse width operator 41, the pulse width adjustor 44 corrects the control information Tru, Trv, and Trw output from the pulse width operator 41. As described later, "Tcp(o)×2fs" refers to a compensation amount that depends on the carrier wave Sc. "Tcp(o)×2fs" may be calculated by the compensation amount calculator 43 instead of the pulse width adjustor 44.

Specifically, when Pm=0 and the selected switching pattern has pattern number "1", the pulse width adjustor 44 uses the following Formula (7) to calculate, for example, timings T1 to T5 respectively corresponding to times t11 to t15 illustrated in FIG. 12. Tcp(o)×2fs is a ratio of the compensation amount in a carrier half-cycle. The pulse width adjustor 44 calculates timings T1 to T5 based on fs corresponding to the carrier frequency setting parameter Pf and based on Tcp(o). As illustrated in FIG. 12, the minimal output voltage phase continuously changes and timings T1 and T2 are calculated based on Tcp(min). Then, the intermediate output voltage phase continuously changes and timings T3 and T4 are calculated based on Tcp(mid). With respect to the remaining carrier half-cycle, timings are similarly calculated using a compensation amount.

$T1=Top-Tcp(\text{min})\cdot 2fs$ $T2=Top+Tbp-Tcp(\text{min})\cdot 2fs$ $T3=Top+Tbp+Tb-Tcp(\text{mid})\cdot 2fs$ $T4=Top+Tbp+Tb+Tcm-Tcp(\text{mid})\cdot 2fs$ $T5=Top+Tbp+Tb+Tcm+Ta \quad (7)$ When Pm=0 and the selected switching pattern has pattern number "2", the pulse width adjustor 44 uses the following Formula (8) to calculate, for example, timings T1 to T5 respectively corresponding to times t11 to t15 illustrated in FIG. 13. As illustrated in FIG. 13, the minimal output voltage phase and the intermediate output voltage phase alternately change, and timings T1 and T3 are calculated based on Tcp(min) while timings T2 and T4 are calculated based on Tcp(mid). With respect to the remaining carrier half-cycle, timings are similarly calculated using a compensation amount.

$T1=Top-Tcp(\text{min})\cdot 2fs$ $T2=Top+Tbp-Tcp(\text{mid})\cdot 2fs$ $T3=Top+Tbp+Tap-Tcp(\text{min})\cdot 2fs$ $T4=Top+Tbp+Tap+Tcm-Tcp(\text{mid})\cdot 2fs$ $T5=Top+Tbp+Tap+Tcm+Ta \quad (8)$ When Pm=0 and the pattern number of the selected switching pattern is "3", the pulse width adjustor 44 uses the following Formula (9) to calculate, for example, timings T1 to T5 respectively corresponding to times t11 to t15 illustrated in FIG. 14. As illustrated in FIG. 14, the intermediate output voltage phase continuously changes and timings T1 and T2 are calculated based on Tcp(mid). Then, the maximum output voltage phase continuously changes and timings T3 and T4 are calculated based on Tcp(max). With respect to the remaining carrier half-cycle, timings are similarly calculated using a compensation amount.

$T1=Tb-Tcp(\text{mid})\cdot 2fs$ $T2=Tb+Tcm-Tcp(\text{mid})\cdot 2fs$ $T3=Tb+Tcm+Ta-Tcp(\text{max})\cdot 2fs$ $T4=Tb+Tcm+Ta+Tan-Tcp(\text{max})\cdot 2fs$ $T5=Tb+Tcm+Ta+Tan+Ton \quad (9)$ When Pm=0 and the selected switching pattern has pattern number "4", the pulse width adjustor 44 uses the following Formula (10) to calculate, for example, timings T1 to T5 respectively corresponding to times t11 to t15 illustrated FIG. 15. As illustrated in FIG. 15, the intermediate output voltage phase and the maximum output voltage phase alternately change, and timings T1 and T3 are calculated based on Tcp (mid), while timings T2 and T4 are calculated based on Tcp (max). With respect to the remaining carrier half-cycle, timings are similarly calculated using a compensation amount.

$$T1 = Tb - Tcp(\text{mid}) \cdot 2fs$$

$$T2 = Tb + Tcm - Tcp(\text{max}) \cdot 2fs$$

$$T3 = Tb + Tcm + Tbn - Tcp(\text{mid}) \cdot 2fs$$

$$T4 = Tb + Tcm + Tbn + Tcm - Tcp(\text{max}) \cdot 2fs$$

$$T5 = Tb + Tcm + Tbn + Tcm + Ton \quad (10)$$

When Pm=1, the pulse width adjustor 44 uses the following Formula (11) to calculate timings T1 to T7 respectively corresponding to times t11 to t17 illustrated in FIG. 16. As illustrated in FIG. 16, the minimal output voltage phase, the intimidate output voltage phase, and the maximum output voltage phase sequentially change. Thus, timings T1 and T4 are calculated based on Tcp(min), timings T2 and T5 are calculated based on Tcp(mid), and timings T3 and T6 are calculated based on Tcp(max). With respect to the remaining carrier half-cycle, timings are similarly calculated using a compensation amount.

$$T1 = Top - Tcp(\text{min}) \cdot 2fs$$

$$T2 = Top + Tbp - Tcp(\text{mid}) \cdot 2fs$$

$$T3 = Top + Tbp + Tap - Tcp(\text{max}) \cdot 2fs$$

$$T4 = Top + Tbp + Tap + Tom - Tcp(\text{min}) \cdot 2fs$$

$$T5 = Top + Tbp + Tap + Tom + Tbn - Tcp(\text{mid}) \cdot 2fs \quad (7)$$

$$T6 = Top + Tbp + Tap + Tom + Tbn + Tan - Tcp(\text{max}) \cdot 2fs$$

$$T7 = Top + Tbp + Tap + Tom + Tbn + Tan + Ton \quad (11)$$

Based on timings T1 to T5 (T1 to T7) calculated for each output phase, the pulse width adjustor 44 generates the PWM control commands Vu1*, Vv1*, and Vw1*, which specify the input phase voltage Vi to be output to the output phases. Then, the pulse width adjustor 44 outputs the PWM control commands Vu1*, Vv1*, and Vw1* to the commutation controller 33.

Thus, the PWM command generator 32 (an example of the command generator) includes the corrector 42. When an output voltage error Voerr is caused by the commutation control, the corrector 42 corrects the pulse width of the PWM pulse voltage specified in the output voltage command Vo* in generating the PWM control command Vo1*. Thus, the matrix converter 1 according to this embodiment ensures accuracy in eliminating or minimizing the output voltage error Voerr caused by the commutation control without correcting the output voltage command Vo*.

In the above-described embodiment, the PWM command generator 32 has been described as using the space vector method to generate the PWM control command Vo1*. It is also possible to use a triangular wave comparison method to generate the PWM control command Vo1*. This case is similar to the case of using the space vector method in that the corrector 42 calculates the compensation amount Tcp(o) corresponding to the output voltage error Voerr caused by the commutation control, and corrects the pulse width of the PWM pulse voltage specified in the output voltage command Vo* based on the compensation amount Tcp(o), so as to generate the PWM control command Vo1*. This ensures accuracy in eliminating or minimizing the output voltage error Voerr caused by the commutation control without correcting the output voltage commands Vu*, Vv*, and Vw*.

In generating the PWM control command Vo1*, the PWM command generator 32 may also select between the space vector method and the triangular wave comparison method based on information input by a user or a person in charge of installation through the input device (not illustrated) of the matrix converter 1.

In the above-described embodiment, the controller 14 has been described as selecting one commutation method from two commutation methods. It is also possible for the controller 14 to select one commutation method from among equal to or more than three commutation methods based on the modulation method parameter Pm.

In the above-described embodiment, the control information Tru, Trv, and Trw, which are output from the pulse width operator 41, have been described as specifying the ratios of vectors. It is also possible for the pulse width operator 41 to generate such control information Tru, Trv, and Trw that specify timings respectively corresponding to times t11 to t15 before correction illustrated in FIG. 15.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A matrix converter comprising:
   a power converter comprising a plurality of bidirectional switches each having a conducting direction controllable by a plurality of switching elements, the plurality of bidirectional switches being disposed between a plurality of input terminals and a plurality of output terminals, the plurality of input terminals being respectively coupled to phases of an AC power source, the plurality of output terminals being respectively coupled to phases of a load;
   a command generator configured to generate a control command based on a voltage command specifying a pulse width of pulse width modulation control; and
   a commutation controller configured to control the plurality of switching elements by a predetermined commutation method based on the control command so as to perform commutation control,
   the command generator comprising a corrector configured to, when an error in an output voltage is caused by the commutation control, correct the pulse width specified in the voltage command in generating the control command so as to reduce the error in the output voltage, and
   wherein the corrector is configured to calculate a compensation amount corresponding to a timing difference caused by the commutation control between a decrease in the output voltage and an increase in the output voltage, and configured to correct the pulse width based on the compensation amount.

2. The matrix converter according to claim 1, wherein the corrector is configured to obtain the compensation amount based on a polarity of an output current obtained from the power converter.

3. The matrix converter according to claim 1, wherein the corrector is configured to obtain the compensation amount based on a type of the commutation method.

4. The matrix converter according to claim 1, wherein the corrector comprises
- a compensation amount calculator configured to calculate the compensation amount each time the control command is changed, and
- an adjustor configured to adjust the pulse width based on the compensation amount obtained by the compensation amount calculator.

5. The matrix converter according to claim 4,
wherein the command generator is configured to use a predetermined carrier wave to calculate the control command,
wherein the commutation controller is configured to perform the commutation control when the control command is changed, and
wherein the compensation amount calculator is configured to calculate the compensation amount based on a frequency of the carrier wave and based on a number of tops and valleys of the carrier wave in a cycle in which the compensation amount is calculated.

6. The matrix converter according to claim 2, wherein the corrector is configured to obtain the compensation amount based on a type of the commutation method.

7. The matrix converter according to claim 2, wherein the corrector comprises
- a compensation amount calculator configured to calculate the compensation amount each time the control command is changed, and
- an adjustor configured to adjust the pulse width based on the compensation amount obtained by the compensation amount calculator.

8. The matrix converter according to claim 3, wherein the corrector comprises
- a compensation amount calculator configured to calculate the compensation amount each time the control command is changed, and
- an adjustor configured to adjust the pulse width based on the compensation amount obtained by the compensation amount calculator.

9. The matrix converter according to claim 6, wherein the corrector comprises
- a compensation amount calculator configured to calculate the compensation amount each time the control command is changed, and
- an adjustor configured to adjust the pulse width based on the compensation amount obtained by the compensation amount calculator.

10. The matrix converter according to claim 7,
wherein the command generator is configured to use a predetermined carrier wave to calculate the control command,
wherein the commutation controller is configured to perform the commutation control when the control command is changed, and
wherein the compensation amount calculator is configured to calculate the compensation amount based on a frequency of the carrier wave and based on a number of tops and valleys of the carrier wave in a cycle in which the compensation amount is calculated.

11. The matrix converter according to claim 8,
wherein the command generator is configured to use a predetermined carrier wave to calculate the control command,
wherein the commutation controller is configured to perform the commutation control when the control command is changed, and
wherein the compensation amount calculator is configured to calculate the compensation amount based on a frequency of the carrier wave and based on a number of tops and valleys of the carrier wave in a cycle in which the compensation amount is calculated.

12. The matrix converter according to claim 9,
wherein the command generator is configured to use a predetermined carrier wave to calculate the control command,
wherein the commutation controller is configured to perform the commutation control when the control command is changed, and
wherein the compensation amount calculator is configured to calculate the compensation amount based on a frequency of the carrier wave and based on a number of tops and valleys of the carrier wave in a cycle in which the compensation amount is calculated.

13. A method for compensating for an output voltage error, the method comprising:
- generating a control command based on a voltage command specifying a pulse width of pulse width modulation control; and
- controlling a plurality of switching elements by a predetermined commutation method based on the control command so as to perform commutation control, the plurality of switching elements each having a controllable conducting direction and being included in a plurality of bidirectional switches, the plurality of bidirectional switches being coupled between phases of an AC power supply and phases of a load,
- the generating step comprising, when an output voltage error in an output voltage is caused by the commutation control, correcting the pulse width specified in the voltage command in generating the control command so as to reduce the output voltage error, and
- wherein the generating step further comprises calculating a compensation amount corresponding to a timing difference caused by the commutation control between a decrease in the output voltage and an increase in the output voltage, and correcting the pulse width based on the compensation amount.

14. A matrix converter comprising:
- a power converter comprising a plurality of bidirectional switches each having a conducting direction controllable by a plurality of switching elements, the plurality of bidirectional switches being disposed between a plurality of input terminals and a plurality of output terminals, the plurality of input terminals being respectively coupled to phases of an AC power source, the plurality of output terminals being respectively coupled to phases of a load;
- command generating means for generating a control command based on a voltage command specifying a pulse width of pulse width modulation control; and
- commutation controlling means for controlling the plurality of switching elements by a predetermined commutation method based on the control command so as to perform commutation control,
- the command generating means comprising correcting means for, when an error in an output voltage is caused by the commutation control, correcting the pulse width specified in the voltage command in generating the control command so as to reduce the error in the output voltage, and wherein the correcting means calculates a compensation amount corresponding to a timing difference caused by the commutation control between a decrease in the output voltage and an increase in the output voltage, and corrects the pulse width based on the compensation amount.

* * * * *